United States Patent
Dehkordi et al.

(10) Patent No.: US 12,367,638 B1
(45) Date of Patent: Jul. 22, 2025

(54) SYSTEMS AND METHODS FOR DISPLAY CONTENT CONVERSION AND OPTIMIZATION FOR VIRTUAL DISPLAY SYSTEMS

(71) Applicant: BRELYON, INC., San Mateo, CA (US)

(72) Inventors: Barmak Heshmat Dehkordi, San Mateo, CA (US); Christopher Barsi, Lee, NH (US); Tarushree Gandhi, San Mateo, CA (US); Ahmed Othman, San Mateo, CA (US); Albert Redo Sanchez, San Mateo, CA (US)

(73) Assignee: Brelyon Inc., San Mateo, CA (US)

( * ) Notice: Subject to any disclaimer, the term of this patent is extended or adjusted under 35 U.S.C. 154(b) by 0 days.

(21) Appl. No.: 18/614,618

(22) Filed: Mar. 22, 2024

(51) Int. Cl.
*G06T 15/80* (2011.01)
*G06T 5/77* (2024.01)
*G06T 7/50* (2017.01)

(52) U.S. Cl.
CPC .............. *G06T 15/80* (2013.01); *G06T 5/77* (2024.01); *G06T 7/50* (2017.01)

(58) Field of Classification Search
CPC .. H04N 13/128; H04N 19/597; H04N 19/136; H04N 13/395; G06T 7/50; G06T 15/04; G06T 15/80; G06T 5/77
See application file for complete search history.

(56) References Cited

U.S. PATENT DOCUMENTS

| | | | |
|---|---|---|---|
| 10,768,442 B1 | 9/2020 | Dehkordi | |
| 11,067,825 B2 | 7/2021 | Dehkordi | |
| 11,196,976 B2 | 12/2021 | Dehkordi | |
| 11,320,668 B2 | 5/2022 | Khorasaninejad et al. | |
| 11,543,655 B1 * | 1/2023 | Weber | G02B 27/0075 |
| 11,592,684 B2 | 12/2023 | Dehkordi | |
| 11,868,672 B1 * | 1/2024 | Dehkordi | G06F 3/1446 |
| 2018/0196263 A1 * | 7/2018 | Vallius | G02B 27/0172 |
| 2019/0377487 A1 * | 12/2019 | Bailey | G06F 1/163 |
| 2021/0157151 A1 * | 5/2021 | Xie | H04N 9/3164 |
| 2021/0294018 A1 * | 9/2021 | Kanbayashi | G02B 6/0053 |
| 2021/0390665 A1 * | 12/2021 | Zhang | G06T 15/503 |
| 2023/0011918 A1 * | 1/2023 | Pohjola | B42D 25/342 |
| 2023/0224431 A1 * | 7/2023 | Krishnan | H04N 21/6587 375/240.02 |
| 2024/0160774 A1 * | 5/2024 | Edwards | G06F 3/04845 |
| 2024/0163476 A1 * | 5/2024 | Valli | H04N 19/103 |
| 2024/0163477 A1 * | 5/2024 | Valli | H04N 19/124 |
| 2024/0177398 A1 * | 5/2024 | Valli | H04N 13/349 |
| 2024/0179294 A1 * | 5/2024 | Valli | H04N 13/312 |
| 2024/0212179 A1 * | 6/2024 | Valli | H04N 19/436 |
| 2024/0212185 A1 * | 6/2024 | Valli | H04N 13/161 |
| 2024/0214539 A1 * | 6/2024 | Valli | H04N 13/128 |

* cited by examiner

*Primary Examiner* — Jin Cheng Wang

(74) *Attorney, Agent, or Firm* — Hsuanyeh Law Group, PC

(57) ABSTRACT

Systems and methods of converting visual content for display on a virtual display system include extracting depth information from input visual content and formatting the input visual content and the depth information. The virtual display system may produce virtual images that are multifocal virtual images. The conversion of the input visual content into the multifocal virtual images may be impacted by properties of the human vision system, physical modeling of the input visual content, user input or sensory data, or generative content.

30 Claims, 19 Drawing Sheets

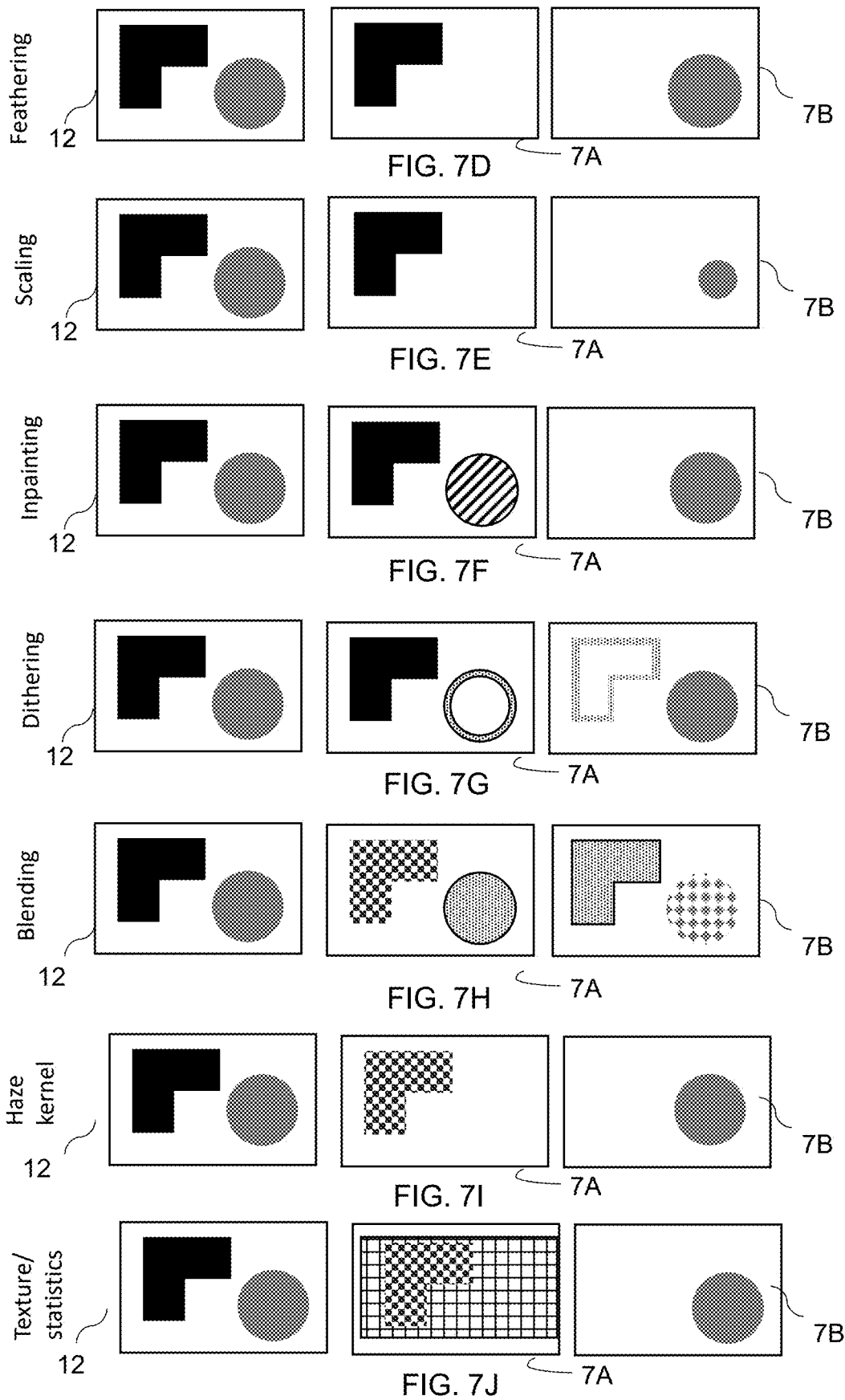

SYSTEMS AND METHODS FOR DISPLAY CONTENT CONVERSION AND OPTIMIZATION FOR VIRTUAL DISPLAY SYSTEMS

TECHNICAL FIELD

The present invention relates generally to content generation for display systems and systems and methods of converting display content that is shown on a first display modality into display content that is shown a second display modality. The first display modality may include two- or three-dimensional content, and the second display modality may be multifocal display content for display on a virtual display system. The systems and methods disclosed utilize software and hardware conversion tools that incorporate the human vision system.

BACKGROUND

In present society, display content is shown in different forms on different display systems. Some of the display systems are virtual display systems. Virtual display systems are designed and implemented with various specifications. For example, in U.S. Pat. Nos. 11,067,825 B2 and 10,768,442 B1, Dehkordi described a virtual display system providing monocular and binocular depth cues to achieve realistic depth perception effects. In U.S. Pat. No. 11,592,684 B2, Dehkordi disclosed an optical component called a field evolving cavity, which folds light back and forth for multiple round trips with the cavity, to make the light source appear farther from the viewer compared to the distance to the physical display system. In U.S. Pat. No. 11,196,976 B2, Dehkordi further disclosed a virtual display system directed to tessellating a light field into a size or depth that is extended beyond the pupil size of a display system. In U.S. Pat. No. 11,320,668 B2, Dehkordi et al disclosed a method of modifying the optical quality or the properties of a display system using optical fusion, which combines computational methods with optical architectures to remove visual artifacts from the images produced by the display system. Last, in U.S. Pat. No. 11,868,672 B1, Dehkordi et al disclosed methods and systems for improving the utilization of an extended display system, including virtual display systems.

SUMMARY

Multimedia visual content pervades many aspects of modern technology. Further, such multimedia visual content takes on different forms, depending on the physical system, or display modality, on which it is displayed. In particular, such content is often used in newer technologies, such as virtual reality (VR), augmented reality (AR), mixed reality (MR), generally extended reality (XR), lightfield displays, holographic displays, (auto) stereoscopic displays, volumetric displays, three-dimensional displays, and the like. As technology advances, it becomes important to be able to convert content that exists in one format into a second format. The conversion can be completed automatically, manually, or semi-automatically. Software tools must be developed to assist in this conversion process. For example, in some embodiments disclosed presently, a conversion system extracts depth information about a visual content input into the conversion system and uses the depth information along with the original input content to produce an output that may be displayed on a display system. The display system may be different that the type of display system the original input content was intended for.

EXAMPLE EMBODIMENTS

The features, aspects, and characteristics of the techniques introduced and described herein include, in at least certain embodiments, the following examples.

General and Embodiment A

1. A conversion system comprising: a first computational module to receive an input visual content; a second computational module to operate on the input visual content with a function to extract a depth information about the input visual content; and a third computational module to format the depth information and the input visual content as content for display as a multifocal virtual image.

2. The conversion system of example 1, further comprising a virtual display system to display the multifocal virtual image.

3. The conversion system of example 1, wherein the first computational module takes as input at least one parameter of a multifocal output template.

4. The conversion system of example 1, further comprising a sensor to capture information about a viewer of the virtual display system, wherein the function of the second computational module uses the information to modify the content of the multifocal virtual image.

5. The conversion system of example 1, wherein the function of the second computational module modifies the content of multifocal virtual image based on a property of a human vision system.

6. The conversion system of example 1, wherein the function of the second computational module modifies the content of the multifocal virtual image based on a physics model of the input visual content.

7. The conversion system of example 1, wherein the function of the second computational module modifies the content of the multifocal virtual image based on a user-defined library.

8. The conversion system of example 1, wherein the function of the second computational module modifies the content of the multifocal virtual image using an in-painting subfunction or an artificial intelligence (AI)-generative subfunction.

9. The conversion system of example 1, wherein the input visual content is selected from a group consisting of a color image, a monochrome image, a video, a movie, an animation, a stereoscopic pair, a three-dimensional point cloud, an anaglyph, an autostereoscopic content, and combinations thereof.

10. The conversion system of example 1, further comprising a graphical user interface to show a list of choices of input visual content, a list of parameters to impact the function, and a locator to determine where to save the content.

11. The conversion system of example 1, wherein the function includes a first function and the second computational module further includes an optimization function that uses a cost function to impact a parameter of the first function.

12. The conversion system of example 1, wherein the function is a first function and the second computational module further includes an optimization function to operate on the input visual content to impact the multifocal virtual image.

13. The conversion system of example 1, wherein the function of the second computational module impacts an optical property of the multifocal virtual image, the optical property being selected from a group consisting of color, intensity, polarization, directionality, and combinations thereof.

14. The conversion system of claim 1, wherein the second computational module operates in real time, and the input visual content is selected from a group consisting of a video game environment, simulation training environment, and a teleconferencing environment.

15. The conversion system of claim 1, wherein the second computational module includes a neural network to operate on the input visual content.

16. The conversion system of claim 1, wherein one of the first computational module, the second computation module, or the third computational module (i) computes a depth map using the depth information, (ii) creates a parameterization of the depth map using a thresholding function, and (iii) assigns pixel values to every focal plane in the multifocal virtual image based on the depth map, the input visual content, and the parameterization.

17. The conversion system of claim 1, wherein the multifocal virtual image is impacted by a multifocal shader, the multifocal shader selected from a group consisting of a feathering shader, a geometric scaling shader, an in-painting shader, a dithering shader, a blending shader, haze shader, and a texture shader.

18. The conversion system of claim 1, wherein the multifocal virtual image is modified by a property of an extended object in the input visual content.

Embodiment B

19. A conversion system comprising: a first computational module to receive an input visual content, a second computational module to operate on the input visual content with a function to extract information about an extended object in the input visual content, and a third computational module to format the information and the input visual content for display as a multifocal virtual image, wherein the information is on a first focal plane, and a portion of the input visual content is on a second focal plane.

20. The conversion system of example 19, further comprising a virtual display system to display the multifocal virtual image.

21. The conversion system of example 19, wherein the virtual display system comprises a first light source that produces a first display content for the first focal plane, and a second light source that produces a second display content for the second focal plane.

22. The conversion system of example 19, wherein the information is a property selected from a group consisting of color, spatial frequency, brightness, size, shape, morphology, and combinations thereof.

23. The conversion system of example 19, wherein the second computational module uses an object detection function to identify the information.

24. The conversion system of example 19, wherein the second computational module uses a threshold function to format the information.

25. The conversion system of example 19, wherein the first focal plane and the second focal plane correspond respectively to a foreground and a background of the multifocal virtual image.

26. The conversion system of example 19, wherein the second computational module includes a library.

Embodiment C

27. A conversion method comprising: receiving an input visual content; operating on the input visual content with a function to extract a depth information of the input visual content; and formatting the input visual content and the depth information for display as a multifocal virtual image.

28. The conversion method of example 27, wherein the input visual content is selected from a group consisting of a color image, a monochrome image, a video, a movie, an animation, a stereoscopic pair, a three-dimensional point cloud, an anaglyph, an autostereoscopic content, and combinations thereof.

29. The conversion method of example 27, further comprising displaying the multifocal virtual image on a virtual display system.

BRIEF DESCRIPTION OF THE DRAWINGS

FIGS. 7A through 7M depicts embodiments in which the depth content of multifocal display content is optimized using different functions and operations.

DETAILED DESCRIPTION

Figure 1:
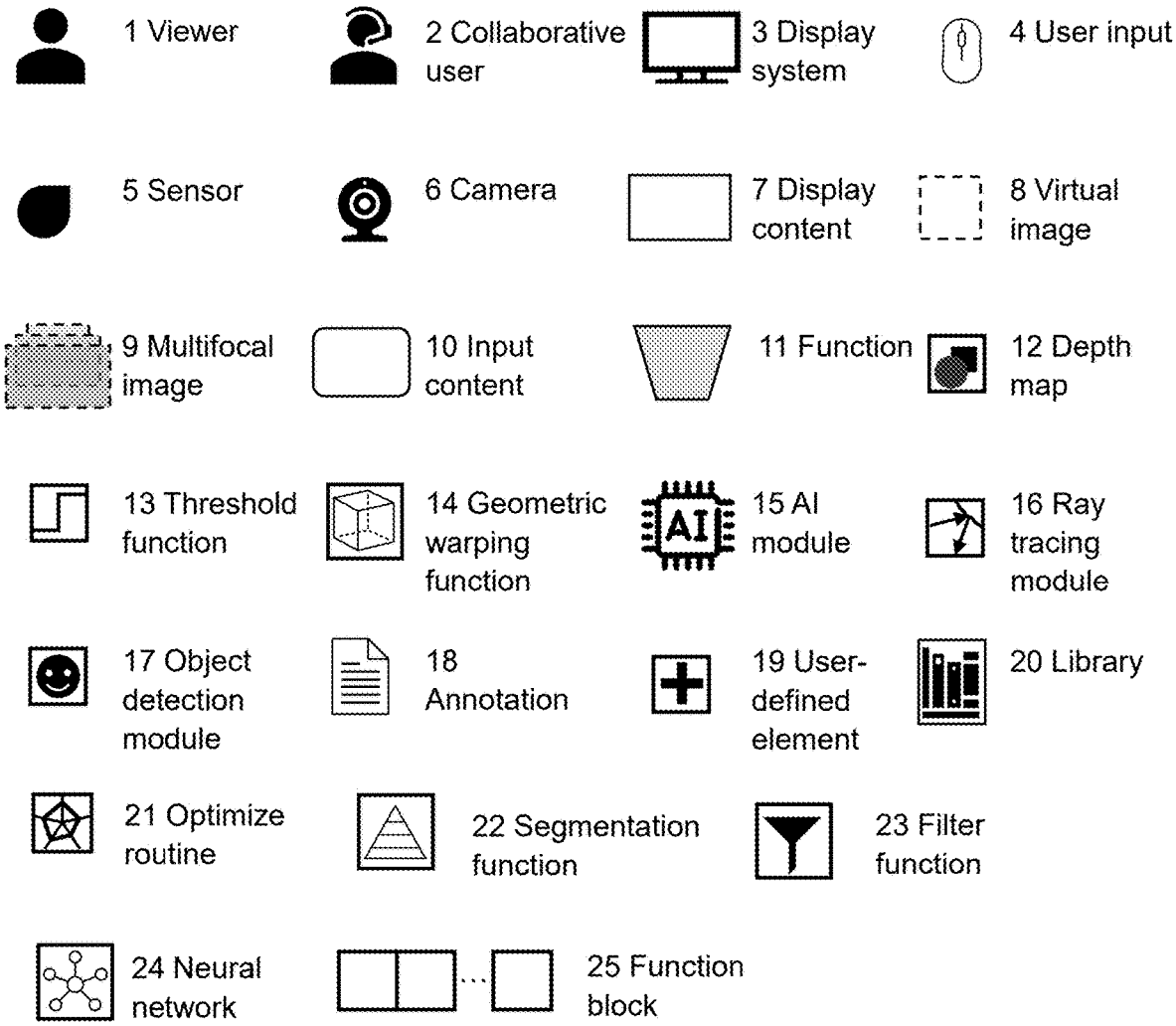
FIG. 1 shows a set of common elements that are used in the various embodiments of the disclosure.

Modern display devices offer new channels of content sharing, content creation, visual effects, and user interaction. Visual content is sometimes passive, as in the case of an image or video. Visual content may also be interactive, as in the case of a video game, training simulation, teleconferencing scenario, teleoperations rig, and the like. Immersive content and hardware, such as augmented reality (AR), virtual reality (VR), extended reality (XR), mixed reality (MR), headsets, and free-standing virtual display systems, are all modalities that offer unexplored methods and software applications to enhance human productivity and entertainment.

In many cases, the format of the content intended to be displayed on one of these platforms is different, or even incompatible, with the format intended for display on a different platform. As such, new tools, methods, and systems are necessary for converting one format into another. In some embodiments, the conversion is automatic, semi-automatic or manual. In some embodiments, the information that is required is underdetermined or unknown. In some of these embodiments, machine learning (ML), artificial intelligence (AI) algorithms, and other software architectures and algorithms are used to perform the content conversion. Some of these tools may also add predictive and generative visual content to enrich the content in new and unique ways to amplify or enrich the user experience.

In some other embodiments, the input content or the converted content contains depth information about the scene that the content shows. In some embodiments, the display content provides images with monocular depth, wherein a viewer experiences accommodation depth cues to at least one image plane. In some embodiments, the content is stereoscopic content. In some embodiments, both stereoscopic and monocular depth cues are provided. A user of the disclosed technology may convert one type of content to another type of content.

In this disclosure, new software methods and software applications are discussed for converting content for one type of display system into content for a different type of display system. Some embodiments described herein disclose such methods and applications configured for use in virtual display systems, and they include methods for generating or extracting depth information from a scene captured in the first content. The converted (output) content may be produced in real-time or not real-time (offline). The converted content in some embodiments is used for productivity, training, video conferencing, telepresence, gaming, or entertainment.

Nomenclature

A "display system" is any device that produces images. Physical sources of display images can be standard 2D images or video, as produced by a display panel or a plurality of display panels, such as a liquid crystal display (LCD), light emitting diode (LED) display, micro-LED display, organic light emitting diode (OLED) display, polymer light emitting diode (POLED) display, active-matrix organic light emitting diode (AMOLED) display, MOLED, and the like. Such display technologies, or a plurality of them, may also be incorporated into other display systems. In some embodiments, spatial light modulators (SLMs) are used. In some display systems, light sources may be coupled with masks or patterned elements to make the light source segmented and addressable. Other sources may be generic light sources, such as one or several LEDs, backlights, or laser beams, configured for use, for example, in projection-based display systems.

Further, a display system may be a headset, a handheld device, or a free-standing system, where the term "free-standing" means that the device housing can rest on a structure, such as a table. In some embodiments, the display system is configured to be attached to a structure by a mechanical arm.

A "virtual display system," is a display system that produces images at two or more perceived depths, or at a perceived depth that is different from the depth of the display panel that generates the image. Such images may rely on monocular depth; they may be stereoscopic, autostereoscopic, or (auto) multi-scopic. A virtual display system may be a free-standing system, like a computer monitor or television set. It may be part of a cellphone, tablet, headset, smart watch, or any portable device. It may be for a single user or multiple users in any application. Virtual display systems may be volumetric or lightfield displays. In some embodiments, the virtual display system is a holographic display, which relies on the wave nature of light to produce images based on manipulating interference the light.

Display systems, including virtual display systems, may incorporate any hardware, including liquid crystals or other polarization-dependent elements to impact properties of the display; any type of mirror or lens to redirect the light path, influence the size in any dimension, modify the focal depth, or correct for aberrations and distortions; any surface coatings, active elements; spectral or spatial filters to assist in image quality; optical cavities; or any type of element or coating to serve as a shield layer or antireflection layer to reduce unwanted, stray, or ambient light from reaching a viewer. In some embodiments, display systems comprise metamaterials and metasurfaces, nonlinear optical elements, photonic crystals, graded-index materials, anisotropic or bi-anisotropic elements, or electro-optic elements. In some embodiments, extended display systems are optical virtual display systems. However, extended display systems can be of any modality, including radiofrequency or acoustic display systems, configured for consumption by a person's human auditory system. The displays, or elements of the display may be curved in some embodiments.

Generally, virtual display systems produce virtual images. A "virtual image" is an image whereby the imaging-forming light rays corresponding to a given point of the image do not physically intersect. Rather, they diverge or are collimated or nearly collimated. When the image-forming light rays are geometrically projected backward, their projections do intersect. This intersection point is the location of the virtual image. (In contrast, the image that is formed by physically intersecting light rays is a real image that may be projected onto a screen or other physical surface without any other focusing elements.)

In some embodiments, a virtual image is viewed by a human viewer. The light forming the virtual image has traveled an optical distance corresponding to the monocular depth at which a viewer perceives the image. That is, the monocular depth is the depth at which the viewers' eyes accommodate (focus to). The geometric plane in space in which the virtual image is located is called the "focal plane." In some embodiments, the monocular depth is modified by curved optical elements. In some embodiments, the focal plane is a non-flat geometric surface. A virtual image comprising a set of virtual images at different focal planes is called a "multifocal image" or a "multifocal virtual image." A multifocal image produces monocular depth cues. A virtual image whose focal plane can be adjusted dynamically, e.g., by varying an optical or electrical property of the display system, is also called a multifocal image. A virtual display system that produces multifocal images may be called a "multifocal display system." The monocular depth may be modified by elements with optical power, such as lenses or curved reflectors. A "multifocal output template" is the set of parameters that correspond to a multifocal display system. The parameters include the number of focal planes, the monocular depths of the focal planes, the field of view, the resolution, and the like.

In some embodiments, 3D effects are triggered using "monocular depth" cues, wherein each eye focuses or accommodate to the appropriate focal plane. Virtual images may be multifocal, varifocal, lightfield images, holographic, stereoscopic, autostereoscopic, or (auto) multi-scopic. The virtual depth of a virtual image may be dynamically adjustable via a control in the display system, a user or sensor input, or a pre-programmed routine.

The depth at which content of a virtual image is located is called a "virtual depth," of "focal plane." For example, a multilayer display system is one in which display content is shown in such a way that a viewer must accommodate his eyes to different depths to see different display content. Multilayer displays comprise transparent displays in some embodiments. Display content at a given virtual depth is called a "layer," "depth layer," or "virtual layer."

In some embodiments, a virtual image includes synthetic imagery resulting from combining different features or points of view of physical objects with data relevant to the context of the application in which the virtual image will be viewed by a viewer or an imaging system. A virtual image may be produced via a combination of hardware and software systems.

In some embodiments, a monocular depth is larger than the distance between the viewer and the light source. For example, the ratio between the monocular depth and the distance may be 1.1, 1.5, 2, 2.5, 3, 4.5, or 5. In some embodiments, the ratio may lie within a range, such as 1.1-2, 1.5-3, or 2-5. In some embodiments, a monocular depth is dynamically adjustable by modifying a property of the virtual display system.

In some embodiments, the virtual image is visible by both eyes of a viewer anywhere within a continuous region called the headbox. A virtual image point being visible by both eyes means that light from that point enters both eyes simultaneously.

It is important to note that each point of the virtual image is visible by both eyes of a human viewer, i.e., that light rays from any given point of the virtual image enter both eyes simultaneously. The viewer's eyes may be located anywhere within a certain volume to see the virtual image. The depth of the virtual image is the depth each eye accommodates or focuses on. The volume is called the headbox, and it spans a lateral dimension. The lateral dimension may be, for example, at least 8 cm, at least 10 cm, at least 15 cm, at least 20 cm, or at least 30 cm. The distance between the display system and the nearest viewing position in the headbox may be, for example, 20 cm, 30 cm, 40 cm, 50 cm, 60 cm, 70 cm, 80 cm, 90 cm, or 100 cm. In some embodiments, the nearest viewing position is greater than 100 cm. This distance is in part limited by the viewing direction required to see the virtual image. A viewer is understood to have his/her eyes within the headbox.

The "human vision system" or "human visual system" (HVS) is the psycho-physical system of a human that provides vision or sight to a person. Generally, it comprises a human's eyes and nervous system. A part of the HVS is the set of cues that provide depth sensing. For example, vergence and accommodation are two ocular-motor depth cues of the HVS. A "property of the human vision system" is a specific parameter of the HVS that gives rise to a certain visual cue or that optimizes a certain visual cue, for example, occlusion, parallax, horopter, the shape, the response, or the morphology of the eye or a part of the eye, such as a lens.

In some embodiments, a focal plane of a virtual image (including a multifocal image) coincides with a portion of a human horopter. The horopter is the locus of points in which the location of an image point on the left retina corresponds to the same location on the right retina. The horopter may be the empirical horopter or the theoretical horopter. In some embodiments, the horopter is the binocular horopter. In some embodiments the horopter is the oculomotor horopter. Image points on the human horopter are fused in the human vision system, so that a viewer sees a single, clear image point, instead of blurry vision. Thus, curved focal planes that are mapped to a human horopter provide both monocular depth cues and binocular depth cues.

An "input visual content" is a graphic or visual dataset that describes images, videos, pictures, and the like that is input into a conversion system, the conversion system producing a display content. Examples include photographs, RGB images or video, monochrome or grayscale images, stereo pairs, parallax barrier display content, anaglyphs, multifocal content, and the like. Input visual content is any content that is consumed visually, by a human or by a camera.

In some embodiments, the input visual content is an image or video of a three-dimensional (3D) scene. The 3D scene may be a physical environment (as in the case of a video or photograph) or it may be a rendered 3D scene (as in the case of a video game, animation, and the like). A "physics model" of the input visual content (or, equivalently, of the 3D scene) is a description of the scene that includes geometry, materials, and lighting. For example, it includes the bidirectional reflectance distribution function (BRDF). It includes the type of the illumination source. It includes the (real or rendered) camera effects.

"Depth information" information of visual content is information about the geometry, shape, or distance, of a scene captured by a recording device. Depth information includes depths to a recording camera, baseline or disparity information, a depth map, and the like.

The term "display content" is used to describe the source information or the final image information that is perceived by a viewer. In some embodiments, the virtual display system produces a headbox whose volume is big enough to encompass both eyes of a viewer simultaneously. In another embodiment, the virtual display system produces a left eyebox and a right eyebox, configured for simultaneous viewing by the left and the right eye, respectively. The size and number of headboxes depends on the specific nature and design of the display.

An "extended object" is an object in an input visual content or a display content that extends beyond a single pixel. An extended object in some embodiments is detected by an object recognition function.

"Angular sensitivity" of a display content is a variation of the virtual image that depends on either the incident angle of light or on the viewing direction.

As used herein, the terms "field-evolving cavity" or "FEC" refer to a non-resonant (e.g., unstable) cavity that allows light to travel back and forth between its components to evolve the shape of the wavefront associated with the light in a physical space. One example of an FEC comprises two or more half-mirrors or semi-transparent mirrors facing each other and separated by a distance. As described herein, an FEC may be parallel to a display panel (in the case of display systems) or an entrance pupil plane (in the case of imaging systems). An FEC may be used for changing the apparent depth of a display or of a section of the display. In an FEC, the light bounces back and forth, or circulates, between components of the cavity. Each of these propagations is counted as a pass. For example, suppose there are two semi-reflective components for the FEC, one at the light source side and another one at the exit side. The first instance of light propagating from the first component to the second component is called a forward pass. When the light, or part of light, is reflected from the second component back to the first component, that propagation is called a backward pass, as the light is propagating backward toward the light source. In an FEC, a round trip occurs when the light completes one cycle and comes back to the first component. FECs can have infinitely many different architectures, but the principle is always the same. An FEC is an optical architecture that creates multiple paths for the light to travel, either by forcing the light to go through a higher number of round trips or by forcing the light from different sections of the same display to travel different distances before the light exits the cavity. If the light exits the cavity perpendicular to the angle it has entered the cavity, the FEC is referred to as an off-axis FEC or a "FEC with perpendicular emission." In an FEC, the light is reflected back and forth, or is circulated, between the elements of the cavity. Each of these propagations is a pass. For example, an FEC may have a first element and a second element. The first instance of light propagating from the first element to the second element is called a forward pass. When the light, or a selected part of light, is reflected from the second element back to the first element, that propagation is called a backward pass, as the light is propagating backward toward the light source. In this cavity, a round trip occurs once the light completes one cycle (forward and backward pass) and returns to the first element. In some embodiments, a round trip occurs when light substantially reverses direction and is incident on an element more than once. The term "round trips" denotes the number of times that light circulates or bounces back and forth between the two elements of a cavity or the number of times light interacts with a single element.

In some embodiments, the light travels one round trip within the FEC. In some embodiments, the number of round trips may be 2, 3, 4, or 5. The number of round trips substantially determines the monocular depth perceived be a viewer. In some embodiments, a monocular depth is larger than the distance between the viewer and the light source. For example, the ratio between the monocular depth and the distance may be 1.1, 1.5, 2, 2.5, 3, 4.5, or 5. In some embodiments, the ratio may lie within a range, such as 1.1-2, 1.5-3, or 2-5. In some embodiments, a monocular depth is dynamically adjustable by modifying a property of the virtual display system.

The mechanism for introducing more round trips includes modifying the properties of the first and second element. For example, by using a different type of wave plate or an LC in the first element, the reflected polarization (after the first-round trip) can be configured differently, such that most of the light is reflected a second time by the second element. Further, the second element may also include a polarization-changing element, such as a wave plate or LC, to modify the polarization of the light that it reflects. Further, both the polarization changes and the reflectivity and transmittivity of these elements may be a function of angle. For example, either element may include a multilayer film. In such embodiments, because the angle of the light rays changes with each round trip, the light may be substantially transmitted by the second element after a desired angle is reached.

In an FEC, the number of round trips determines the focal plane of the image and, therefore, the monocular depth cue for a viewer. In some embodiments, different light rays travel different total distances to produce multiple focal planes, or a multi-focal image, which has a plurality of image depths. In some embodiments, an image depth is dynamic or tunable via, e.g., electro-optic structures that modify the number of round trips.

A "lightfield" is a mathematical model of light propagation that relies on geometric ray approximation. Some lightfield models incorporate wave-based effects like diffraction. A lightfield display is a three-dimensional display that is designed to produce 3D effects for a user using lightfield modeling. A concentric lightfield display is a light field display in which for any two pixels of the display at a fixed radius from the viewer, the chief ray of the first pixel's light cone intersects with that of the second pixel's light cone. A concentric light field display produces an image that is focusable to the eye at all points. A "lightfield display" is a display that relies on a lightfield for producing virtual images.

A display system can produce images, overlay annotations on existing images, feed one set of display content back into another set for an interactive environment, or adjust to environmental surroundings. Users may have VR, AR, XR experiences, video-see through effects, monitor remote systems and receive simultaneous predictive suggestions, provide an avatar with permissions to make imprints on digital content or online resources, or use AI for generative content creation. In some embodiments, a subsection of the display content is input into an algorithm to impact another subsection.

Display content may be manipulated by a user or interactive with a user through various input devices. Input devices are types of sensors that take in a user input, usually deliberately rather than automatically. Input devices, such as cameras, keyboard and mouse input, touch screens, gesture sensors, head tracking, eye tracking, VR paddles, sound input, speech detection, allow for user feedback in multiple modalities. In some embodiments, various biological or health sensors capture information—such as heart rate, posture, seating or standing orientation, blood pressure, eye gaze or focus—and use that information in an algorithm to influence or impact the displayed content.

In some embodiments, for example, eye gaze may be detected, and the locations of the eye gaze may be tracked. Eye gaze detection may measure a person's focus, i.e., where that person is looking, what that person is looking at, how that person is blinking or winking, or how that person's pupils react (e.g., changes in pupil size) to any stimuli, visual or otherwise. A sensor, such as an infrared sensor, may shine infrared light onto the eyes detect changes in reflectivity based on eye motion. In some embodiments, a camera captures images of the eyes, and a convolutional neural network (CNN) is used to estimate the eye gaze. Once the eye gaze is detected or known by the display system, the display content may change based on the eye gaze. For example, the eye gaze might be such that a user is looking at a particular display content that corresponds to an action that the user may take, such as displaying a menu. In another example, a first layer may display a wide-field image of a scene or a user's location on a map, and eye tracking feedback zooms into a particular region or displays annotations about the region that is the focus of the eye gaze. This example may be called telescoping functionality.

In some embodiments, user input or environmental input can be generated through other various sensors or AI mechanisms that can interface with the display system directly or indirectly. Sensors include any type of camera, pressure or haptic sensors, sensors detect health biological information about a person or the environments, clocks and other timing sensors, temperature sensors, audio sensors (including any type of microphone), chemical sensors, or metrology sensors for scientific and engineering purposes.

Sources of display content may be local or remote. Sources include local workstations, laptops, computers, edge devices, distributed sensors, the internet, cloud sources, servers or server farms, or any electronic device that can communicate data. Sources can include microcontrollers, field programmable gate arrays (FPGAs), cloud computers or servers, edge devices, distributed networks, the internet of things (IoT). Sources may operate on the data before transmitting it to the display system, and sources may receive data from the display system to operate on.

Remote sources include, but are not limited to, cloud servers, the internet, distributed networks or sensors, edge devices, systems connected over wireless networks, or the IoT. Remote sources are not necessarily located far away and may include processing units (CPUs, GPUs, or neural processing units (NPUs)) that are operating on a station other than a local source. The local source is hardwired to the user interface system and acts as the main workstation for the main display portion of an extended displays.

A "communication channel" refers to a link between at least two systems or users that allows the transmission of information and data, for example, between a source and a display. It may be hardwired or wireless. Communication channels include the internet, ethernet, USB, wireless networks, any short-range wireless technology (such as Bluetooth), fiber optic systems, digital subscriber line (DSL), radiofrequency (RF) channels such as coaxial cable, and the like.

Latency is the delay between the instant information begins transmission along a communication channel and the instant it is received at the end of the channel. Typically, there is a tradeoff between latency and content bandwidth. For remote sources, latency of data communication is a parameter that can be integrated into designing software applications. Latency in remotely generated content can be incorporated into ML weights and linear layers of various neural networks.

In some embodiments, various AI and ML algorithms can be incorporated into visual predictive services. Existing learning algorithms such as generative pre-trained transformers and bidirectional encoder representations from transformers may be generalized, as described herein, for user actions and incorporated into the extended display system to command part or the entire extended display.

Applications include, but are not limited to, graphical predictive assistants and virtual assistants, quality control, teleoperations, flight simulations and defense, medical and diagnostic imaging, e-sports and gaming, financial trading. In these use cases, multidimensional datasets must be displayed in intuitive ways, so that a user may make an informed decision. In some embodiments, predictive analyses can be computed. In some embodiments, virtual avatars, or AI systems with user-granted permissions act on these predictive analyses. Examples of AI generative content include text-to-image, image-to-text, image- or text-to-task, text-to-code, text-to-reasoning, image- or text-to-recommendation, or any other combination An AI function or module may be assisted in content generation by probabilistic analysis to combine different models or training data.

The terms "user" or "viewer" refer to a person interacting with a system using a sense, which could be visual, auditory, tactile, or olfactory. In some embodiments, the system is a display system or a virtual display system. A user may also be a future user, who will use a system at a different time, to allow for asynchronous applications.

An "annotation layer" is display content that provides context, more information, or descriptions of other content in the display system. For example, an annotation layer might be a layer or focal plane in a multilayer display. An annotation layer provides graphics or text annotations about the content in the other layers. Other formats of extended displays may also include annotations. An annotation may be displayed on hovering graphics, on extended FoV displays, or overlaid on top of the associated display content in a single image.

In some embodiments, other properties of interest of the display content include, but are not limited to, resolution, refresh rate, brightness, FoV, viewable zone, monocular depth, or accommodation, vergence, eye box or headbox.

Generally, a "visual environment" is a collection of display content or virtual images, which may be able to interact with each other. The display content may have as its source camera images or computationally rendered images, such as computer graphics. The visual environment can be a virtual reality environment, in which all the content is virtual display content; it can be an augmented or mixed reality environment, in which virtual images are super-imposed a physical environment; or in can be a conventional image content from a display panel like an LCD panel. In some embodiments, the visual environment comprises only one virtual image. Visual environments may be used by a single user in the kinematic rig, or they may be shared or displayed by a plurality of display systems that are in communication with each other through, for example, the internet, or any type of wired or wireless network. A "shared visual environment" is a visual environment that may be used for any collaborative activity, including telework applications, teleconferencing, web conferencing, online teaching, or collaborative or multi-player gaming. In a visual environment or a shared visual environment, different users may view the display content from different perspectives, and in some embodiments the shared visual environment is immersive, such that two users each using a display in a separate location but in the same shared visual environment perceive that they are physically next to each other, or such that a user perceives being in a location other than the physical location of the display system, for example, by navigating in visual environment, or having collaborative users in the peripheral area of a virtual panorama.

Display systems, including virtual display systems, are useful for varied applications, including video games, game engines, teleoperations, simulation training, teleconferencing, and computer simulations.

A video game is an electronic game involving interaction with one or more players through a user interface and utilizes audio and visual feedback to create an immersive and interactive gaming experience. Video games may be designed for a variety of platforms, including consoles, personal computers, mobile devices, and virtual reality systems, and may incorporate various game genres, such as action, adventure, role-playing, simulation, sports, puzzle, and strategy games. The game mechanics and rules may vary depending on the game, but they usually involve an objective that the player(s) must achieve within the game's environment. A game engine is a platform for generating video games.

Teleoperations is a method of controlling a remote device or system that enables a human operator to perform tasks on the remote device or system in real-time. The teleoperation system typically includes sensors and actuators for the operator to perceive and manipulate the remote environment, as well as a user interface that provides feedback and controls for the operator. The remote device or system may be located in a hazardous or difficult-to-reach location, or it may require specialized skills or expertise to operate, making teleoperations a useful tool in a variety of industries, including manufacturing, construction, exploration, and remote-controlled vehicle use. The teleoperation system may also incorporate artificial intelligence and machine learning algorithms to enhance the operator's abilities and automate certain aspects of the remote operation.

Teleconferencing is a technology that enables remote participants to communicate and collaborate in real-time conferences over a communication channel, such as the internet. The teleconferencing system usually includes both hardware and software components that allow participants to connect to the conference and interact with each other, such as a camera, microphone, speaker, display screen, and user interface. The system may also incorporate features such as screen sharing, file sharing, virtual whiteboards, and chat messaging to enhance the collaboration experience. Teleconferencing is commonly to facilitate remote meetings, presentations, training sessions, and consultations, allowing participants to communicate and work together without the need for physical travel.

Simulation training is a technology that replicates the experience of a task in a simulated environment, typically using computer software and specialized hardware. An example is a flight simulation technology, which simulates the task of flying an aircraft. The flight simulation system typically includes a cockpit simulator or control interface that mimics the controls and instruments of a real aircraft, as well as a visual display system that provides a realistic representation of the simulated environment. The simulator may also incorporate motion and sound effects to enhance the immersive experience. Flight simulations can be used for a variety of purposes, such as pilot training, aircraft design and testing, and entertainment. The simulation may be based on real-world data and physics models to accurately replicate the behavior of the aircraft and its environment, and it may also incorporate scenarios and events to simulate various flight conditions and emergencies. User inputs to a flight simulation training application include a yoke and throttle, physical panels, or touch screens.

A computer simulation is a digital model of a real-world system or process that is designed to mimic the behavior and interactions of the system or process under different conditions. Computer simulations usually use mathematical algorithms, computer programs, and data inputs to create a visual environment in which the behavior of the system can be explored and analyzed. The simulated system may be a physical object or phenomenon, such as a weather system, a chemical reaction, an electromagnetic phenomenon, or a mechanical device, or it may be an abstract concept, such as a market or a social network. Computer simulations can be used for a variety of purposes, such as scientific research, engineering design and testing, and training and education. The accuracy and complexity of computer simulations can vary widely, depending on the level of detail and fidelity required for the particular application. Often the computer simulation allows a user to interact with the details of the simulated system by changing the modeling parameters or computational parameters.

In any embodiment, any sensor can be used to provide information about a user, an environment, or other external conditions and scenarios to the display system. In some embodiments, for example, a camera is used to capture information about a user or a user's environment. Multiple cameras, or a camera array, or a camera system can be used. In some embodiments, depth cameras capture information about depth or sense gestures and poses and they can be of any type. In this disclosure, a "depth camera," "depth sensor," or "RBGD camera" is an imaging device that records the distance between the camera and the distance to an object point. It can be actively illuminated or passively illuminated, and it can include multiple cameras. Light detection and ranging (LIDAR), and time-of-flight cameras are examples of active depth cameras. A depth camera can also use optical coherence tomography sensing (i.e., autocorrelation). It can use infrared (IR) illumination to extract depth from structure or shading. Depth cameras can incorporate gesture recognition or facial recognition features. Depth can also be estimated from conventional cameras or a plurality of conventional cameras through, for example, stereo imaging. The camera array or camera system can include any combination of these cameras.

A "gesture" is a motion, facial expression, or posture orientation of a user, which are normally interpreted by a person or by a computer to indicate a certain desired change, emotion, or physical state. They are typically on a time scale observable by a human being. Micro-gestures are motions, expressions, or orientations that occur within a fraction of a second. They are usually involuntary and indicate similar features as gestures. They can include brief shifts in eye gaze, finger tapping, or other involuntary actions. Gestures may be captured by a camera and identified or classified by a deep learning algorithm or convolutional neural network.

Generally, the "geometry" of a person, user, object, display image, or other virtual or physical object is a term that includes both the position and the orientation of the item. In some embodiments, the geometry of an object may correspond to the shape, i.e., by how much an object is distorted, stretched, skewed, or generally deformed. For example, a camera and algorithm together may be used to identify the location of a physical object in space.

In this document, the terms "machine readable medium," "computer readable medium," and similar terms are used to refer to non-transitory mediums, volatile or non-volatile, that store data and/or instructions that cause a machine to operate in a specific fashion. Common forms of machine-readable media include, for example, a hard disk, solid state drive (SSD), magnetic tape, or any other magnetic data storage medium, an optical disc or any other optical data storage medium, any physical medium with patterns of holes, a random access memory (RAM), a programmable read-only memory (PROM), erasable programmable read-only memory (EPROM), a FLASH-EPROM, non-volatile random access memory (NVRAM), any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

A "processing device" may be implemented as a single processor that performs processing operations or a combination of specialized and/or general-purpose processors that perform processing operations. A processing device may include a central processing unit (CPU), graphics processor unit (GPU), accelerated processing unit (APU), digital signal processor (DSP), field programmable gate array (FPGA), application specific integrated circuit (ASIC), system on a chip (SOC), and/or other processing circuitry.

AI is any intelligent operation produced by a machine. Intelligent operations include perception, detection, scene understanding, generating, or perceiving information, or making inferences. The terms "neural network," "artificial neural network," or "neural net" refer to a computational software architecture that are example implementations of AI and that is capable of learning patterns from several data sources and types and making predictions on data that it has not seen before. The types, algorithms, or architectures, of neural networks include feedforward neural networks, recurrent neural networks (RNN), residual neural networks, generative adversarial networks (GANs), modular neural networks, or convolutional neural networks (CNN) (used for object detection and recognition). Neural networks can comprise combinations of different types of neural network architectures. The parameters of a neural network may be determined or trained using training data. Neural networks can be supervised or unsupervised. The learning can be completed through optimization of a cost function. In some embodiments, the neural network architecture is a radial basis network, multi-layer perceptron architecture, long-short term memory (LSTM), Hopfield network, or a Boltzmann machine. Neural network architectures can be one-to-one, one-to-many, many-to-one, many-to-many. Any of the AI algorithms can be used in the AI-based embodiments in this disclosure. For example, a GAN may use an optimization by stochastic gradient descent to minimize a loss function. An LSTM or RNN may use a gradient descent algorithm with backpropagation.

A "transformer" is a machine learning model in deep learning that relies on self-attention to weigh input data in diverse ways. Transformers are often used in computer vision and natural language processing (NLP). They differ from RNNs in that the input data is processed at once, rather than sequentially. Generative pre-trained transformers and bidirectional encoder representations from transformers are examples of transformer systems. Applications include video or image understanding, document summarization or generation, language translation, and the like.

Learning algorithms may be supervised or unsurprised. Some supervised learning algorithms used to implement the embodiments disclosed herein include decision trees or random forest, support vector machines, Bayesian algorithms, and logistic or linear regression. Unsupervised learning gains information by understanding patterns and trends in untagged data. Some algorithms include clustering, K-means clustering, and Gaussian mixture models. In some embodiments, non-neural network computational methods are used to generate display content. In some embodiments, neural networks are combined with other computational methods or algorithms. Other computational methods include optimization algorithms, brute force algorithms, randomized algorithms, and recursive algorithms. Algorithms can implement any mathematical operation or physical phenomena.

A "generative function" is a function that takes in an input and outputs new content produced by an AI module. In some embodiments the generative function is also influenced, impacted, or parametrized by a user's input, profile, history. The user profile contains information about the user, for example, interests, goals, desired viewing content, or demographics. The user history is the historical usage made by a user of a particular application or set of applications. It may be, for example, a search history, a list of email correspondents, a list of media that the user viewed in a given time period, and the like.

A "graphical user interface," or "GUI," refers to any user interface displayed on a display system that allows a user to interact with the system and information in a graphical and visual manner. A GUI may include different ways for a user to input information, such as radio buttons, toggle switches, drop down menus, or scroll bars. The GUI allows the user to interact with or generate software, or to interact with electronic devices.

A "function" is a mapping that takes in a piece of content to produce a different piece of content, or to annotate or modify the original content. A function may be an algorithm to implement a mapping or operation. A function may take in multiple pieces of content and output multiple pieces of content. The functions may be low-level, for example, mathematical operations or image processing functions. The functions can be mid-level, for example, take in an image and detect a feature, such as an edge, within a scene. A function may be a computer-vision-assisted function. Or the function can enhance the property of the content. The function can be high-level, for example, and generate content or detect a class of objects or make predictions about future possible actions taken by a viewer observing the input content. In some embodiments, functions are predefined. In some embodiments, functions are user-defined. Functions may be enacted through AI, including neural networks, encoder/decoder systems, transformers, or combinations of these examples. Functions may also include various methods to optimize, sort, or order various data or images. Functions may be deterministic or stochastic. They may take multiple inputs and produce multiple outputs, which may depend on time.

An in-painting function is a function that generates pixel content. In some embodiments it is an example of a computer vision function. In some embodiment it is an AI function A pixel is a subcomponent of a display system or a display panel that takes on a single value of intensity, in the case of monochrome images, or a single RGB triplet, in the case of RGB displays. Other optical properties include color, intensity, polarization, and directionality.

A focal plane has monocular depth. In some embodiments, the multifocal conversion functions are analogs to computer graphics functions such as stencil buffers, shaders (vertex, surface, fragmentation, geometry, tessellation, etc.). In some embodiments, the multifocal conversion system acts as a real-time rendering.

An example of a computational function is a simultaneous localization and mapping (SLAM) function, which constructs or updates a map of an environment and tracks users or objects in it. SLAM algorithms may involve taking as input sensory data, such as a camera, and calculating the most probable location of an object based on the sensory data. The solution may involve an expectation-maximization algorithm. Particle or Kalman filters may be used.

Another function may be used for tracking an object or a user's body part, such as in a head-tracking use case. Tracking may be implemented with a constant velocity model.

In this description, references to an "embodiment," "one embodiment" or similar words or phrases mean that the feature, function, structure, or characteristic being described is an example of the technique or invention introduced here. Occurrences of such phrases in this specification do not necessarily all refer to the same embodiment. On the other hand, the embodiments referred to herein also are not necessarily mutually exclusive.

The various embodiments set forth herein are described in terms of exemplary block diagrams, flow charts and other illustrations. As will become apparent to one of ordinary skills in the art after reading this document, the illustrated embodiments and their various alternatives can be implemented without confinement to the illustrated examples. For example, block diagrams and their accompanying description should not be construed as mandating a particular architecture or configuration.

All illustrations, drawings, and examples in this disclosure describe selected versions of the techniques introduced here and they are not intended to limit the scope of the techniques introduced here. Additionally, throughout this disclosure, the term "arbitrarily engineered" refers to being of any shape, size, material, feature, type or kind, orientation, location, quantity, components, and arrangements of components with a one or more components that would allow the present invention or component of the present invention to fulfill the objectives and intents of the present invention or of that specific component within the invention.

All such components and software can be arbitrarily engineered to deliver the desired profile. As used herein, "arbitrary parameter variation" refers to variations, changes, modulations, programing, benchmarking, optimizing, and/or control of parameters, which can include one or a plurality of the following variations: bandwidth, channel capacity, brightness, focal plane depth, parallax, permission level, sensor or camera sensitivity, frequency range, polarization, data rate, geometry or orientation, sequence or timing arrangement, runtime, or other physical or computational properties.

Some capabilities described herein such as functions, visual templates, graphical user interfaces, input stream reception, and input stream generation, may be implemented in one or more modules. A module comprises the hardware and/or software, to implement the capability. For example, such a capability may be implemented through a module having one or more processors executing computer code stored on one or more non-transitory computer-readable storage medium. In some embodiments, a capability is implemented at least in part through a module having dedicated hardware (e.g., an ASIC, an FPGA). In some embodiments modules may share components. For example, a first function module and a second function module may both utilize a common processor (e.g., through time-share or multithreading) or have computer executable code stored on a common computer storage medium (e.g., at different memory locations).

In some instances, a module may be identified as a hardware module or a software module. A hardware module includes or shares the hardware for implementing the capability of the module. A hardware module may include software, that is, it may include a software module. A software module comprises information that may be stored, for example, on a non-transitory computer-readable storage medium. In some embodiments, the information may comprise instructions executable by one or more processors. In some embodiments, the information may be used at least in part to configure a hardware such as an FPGA. In some embodiments, the information for implementing capabilities such as functions, visual templates, graphical user interfaces, input stream reception, and input stream generation may be recorded as a software module. The capability may be implemented, for example, by reading the software module from a storage medium and executing it with one or more processors, or by reading the software module from a storage medium and using the information to configure hardware.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in numerous ways. Different combinations and sub-combinations are intended to fall within the scope of this disclosure, and certain method or process blocks may be omitted in some implementations. Additionally, unless the context dictates otherwise, the methods and processes described herein are also not limited to any sequence, and the blocks or states relating thereto can be performed in other sequences that are appropriate, or may be performed in parallel, or in some other manner. Blocks or states may be added to or removed from the disclosed example embodiments. The performance of certain operations or processes may be distributed among computer systems or computers processors, not only residing within a single machine but deployed across several machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

FIG. 1 depicts a set of icons or elements that are commonly used throughout the present disclosure. Element 1 is a viewer, or user, of a display system. In some embodiments, the user of the display system is also a user of a conversion system. Element 2 is a collaborative user or collaborative user, who participated in activities with a viewer of display content of a display system by being viewable in or manipulating the display content. The collaborative user is, in some embodiments, participating through a communication channel. Element 3 is a display system. In some embodiments, the display system is a virtual display system. In some embodiments, the virtual display system is a multifocal display system. In the embodiments described herein, display systems are virtual display systems, but those skilled in the art can adapt and execute this description for use in any display system. In some embodiments, the display system purely receives data for display as content. In some embodiments, it may also process the data. A display system may include audio systems, such as microphones or speakers, that are synchronized to impact the display content. They may be integrated into the display system.

Element 4 depicts a generic input device. Element 5 depicts a generic sensor that captures information about a person, a user, or an environment and communicates that information. The generic sensor may include a camera. Element 6 depicts a generic camera or camera system. Element 7 is a display content. This is the content that is displayed on a light source of a display system. For example, if the light source is an LCD panel, the display content is the set of pixel values on the LCD panel.

Element 8 depicts a generic image or display content being viewed by a viewer. In some embodiments, the display content 7 and the virtual image are the same. Element 9 is a multifocal image. The image could be an independent display content, or it can be a subsection of a larger display content, the rest of which is pulled from a different light source. The number of layers can be arbitrary, for example, 2 layers, 3 layers, 6 layers, 8 layers, and the like. In some embodiments, the layer properties, such as the focal depth, are tunable.

Element 10 is an input visual content that is input into a conversion system.

Element 11 depicts a block diagram icon describing a function acting on at least one data stream.

Element 12 is a depth map. The depth map may be the depth map of an image, or it may represent a sequence of depth maps corresponding to frames in a video.

Element 13 is a threshold function.

Element 14 depicts a generic geometric transformation function. An example of a geometric transformation algorithm is a pose warping algorithm. Pose or motion warping may involve comparing the time series of the positions of points on an object and using a dynamic time series (which may also be used for, e.g., speech recognition) algorithm to optimize those distances. Transformation functions may also be spline-based to transform various parameter curves. Such transformation functions or algorithms may also be used for stride warping, perspective warping, orientation warping, deformation warping, or motion warping. The geometric transformation function may act on synthetic data, such as data about characters in a video game, or it may act on real data, such as an image of a user captured by a camera and segmented from the environment based on a machine learning algorithm.

In this disclosure, geometric transformation is any kind of geometric transformation, including shifts, rotations, affine transformations, homograph transformations. Geometric transformation also includes computational remapping. For example, depth remapping is an example in which a user's distance to a camera is processed to render a virtual image that maintains the correct physical or geometric proportions. Depth remapping may use isomorphism or homography to assess the remapping. Geometric transformation also includes dewarping, which is used to remove distortions that may be caused by an optical system, including fisheye distortion or barrel/pincushion distortion.

Element 15 depicts a generic AI module. Example AI modules may include a neural network, a transformer, or other deep learning or ML algorithms. An AI module may comprise several AI modules that interact with each other, for example, by each feeding its own output content into the input of the others. In some embodiments, an AI module comprises several AI modules performing interrelated tasks, for example, composing a movie, such that one module produces audio content and another visual content, with the audio content affecting the video content and vice versa. In some embodiments, multiple AI modules are configured to individual tasks in parallel. Generally, a "computational module" is a device configured to process an input in a specified way or to execute a function or a set of functions. In some embodiments, the computational module is implemented through a set of computational modules, each member of the set performing a respective function or part of a function's process. In some embodiments, each of the computational modules that compose the set are individual functions. Computational modules tend to have specific functions and are usually different from generic processing in, e.g., a computer. The function is arbitrary and need not be one-to-one. It may be many-to-one, one-to-many, and the like. In some embodiments, the function is an operator, such as a convolution or Fourier transformation. Some functions may include optimization functions or optimization algorithms that produce outputs based on minimizing a cost function.

Examples of computational modules that are composed of a set of computational modules include the following. In some embodiments, a member of the set of computational modules is one to receive input content or data. Such a computational module may include a function to process or format the data into a form that is manipulatable by subsequent members of the set of computational modules. For example, a computational module may receive an input image or video file that is of the form AVI, MP4, MKV, MOV, WMV, FLV, WEBM, MPEG, AVCHD, DV, DivX, JPEG, PNG, GIF, TIFF, BMP, RAW, SVG, PDF, ICO, PSD, HEIF, and the like. In some embodiments, this receiving computational module requires a user input to select the file directory and the file itself. In some embodiments, this receiving computational module must convert the file type into a different file type to make it amenable for further processing. In some embodiments, the pixels of an image or frame of a video are sorted into a matrix or datacube. In some embodiments, the input content is parsed or subdivided into segments, e.g., sub-images or sub-videos, or they are spliced together so that the resulting size of the content is appropriate for further computational modules, such as a neural network that takes as input an image size of a certain size. Here, "image size" refers to the number of pixels and their arrangement, i.e., the resolution, which could be 720p, 1080p, 2048×1080, 2560×1440, 3840×2160, 4096×2160, 5120×2880, 7680×4320, 10240×4320, 15360×8640, and the like. Additionally, the aspect ratios may be 4:3, 16:9, 1.85:1, 2.39:1, and the like.

In some embodiments, a second computational module in the set of computational module extracts depth information from the (potentially modified or formatted) input visual content. For example, in some embodiments, a neural network receives operates on the input visual content and is trained to produce a depth map. In some embodiments, the second computational module is an object detection module to identify extended objects or features of the input content and assign depth values to them. In some embodiments, the second computational module is an identity operator that operates trivially (essentially multiplication by 1) on a depth channel of an RGBD image or video.

In some embodiments, a third computational module extracts depth information and modifies or operates on it, or it operates on a depth map. A segmentation function, thresholding function, adaptive thresholding function are examples that take depth information and assist in assigning pixels of the depth map or the input visual content to certain depth planes. In some embodiments the third computational module may perform other functions, including the various functions of FIGS. 7A through 7G.

Element 16 is a ray tracing module, which is a module that uses ray tracing methods to produce or render a scene. In some embodiments the ray tracing is real-time ray tracing. Element 17 is an object detection module. The object detection module may be enabled by a computer vision algorithm to detect a type of an object or a feature of an object.

Element 18 depicts a generic annotation. This includes, for example, text or graphics that appear in a multilayer display, or it may be used as a specific function that produces an annotation.

Element 19 depicts a user-defined action or user-defined model/template. Any component of the software techniques here may be user-defined.

Element 20 is a library, which is a pre-programmed set of functions. In some embodiments, the library is user defined. Element 21 is an optimization module, which serves to optimize a feature, parameter, or characteristic of visual content. In some embodiments, the optimization module minimizes a cost function or maximizes a function. In some embodiments, the optimization uses gradient decent, genetic algorithms, simulated annealing, particles swarm optimization, and the like. In some embodiments, the optimization is a convex optimization algorithm.

Element 22 is a filter function, which is a function that reduces or enhances certain features of a visual content. For example, a low pass spatial filter may smooth edges, whereas a high pass spatial filter may enhance them. Filtering may be low-level, mid-level or high-level. For example, a low-level filter may be a Fourier or spatial frequency filter, wherein an image is 2D-Fourier transformed, a region of the Fourier transform is deleted or enhanced, and the inverse Fourier transforms is calculated. A deleted region corresponds to those spatial scales eliminated, and an enhanced region brightens those features relative to the rest of the image. Mid-level filters may use computer vision functions to detect certain features or objects. High-level filtering may use context-based approaches or AI methods for understanding the context of a scene and operating on it based on that understanding.

Element 23 is a segmentation function. The segmentation function uses an AI module or neural network. In some embodiments, the segmentation is semantic segmentation, which divides an image into different meaningful subsets or segments, representing objects or parts of objects without distinguishing between instances of the same class. Each pixel in the image may be assigned a class label, indicating the category it belongs to. For example, in a street scene, pixels might be labeled as road, car, pedestrian, and the like. Segmentation function algorithms include thresholding, region growing, clustering-based segmentation, watershed algorithm, graph-based segmentation, edge-based segmentation, active contour models (snakes), convolutional neural networks (CNNs), Markov-random fields (MRFs), level set methods Element 24 is a neural network, which indicates that the input is processed by a neural network. Element 25 is a function block, which indicates the input is processed by a function as defined above.

Figure 2A:
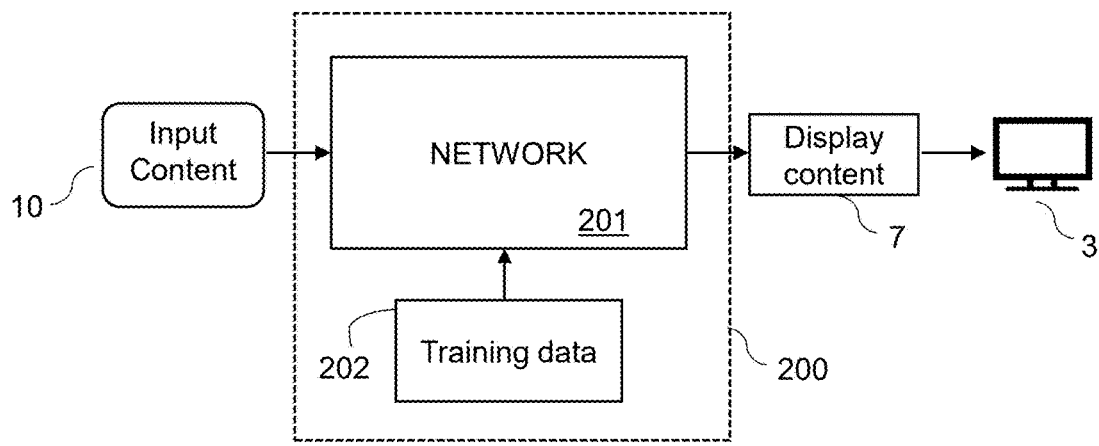
FIGS. 2A through 2D shows a set of high-level flow diagrams of various embodiments of the disclosed conversion system.

FIGS. 2A through 2D illustrate a set of flow diagrams for converting an input visual content into a display content. In FIG. 2A is a computational module 200. In this embodiment, an input content 10 is input into a network 201, which produces a display content 7. In some embodiments the display content is displayed on a virtual imaging system. In some embodiments, the resulting virtual image is a multifocal image. In some embodiments, the network is a neural network, which is training using training data 202. The training data correspond to inputting known input content and iteratively producing known display content. The parameters of the neural network are adjusted to minimize a cost function. In some embodiments the learning is supervised. In some embodiments it is unsupervised. In some embodiments, the display content 7 is multifocal display content that is used to produced a multifocal virtual image.

In some embodiments, a GUI is presented to a person who is using the conversion system. The GUI may allow the user to do some or all of the following: to choose an input content file and type, choose properties of the output file (display content), choose a location where to save the output file (by, e.g., using a locator dialog box to select a location in a directory of a computer), to initiate the conversion by providing extra input (such as a course depth map), to choose a method of conversion or an algorithm of a conversion method, and the like.

Figure 2B:
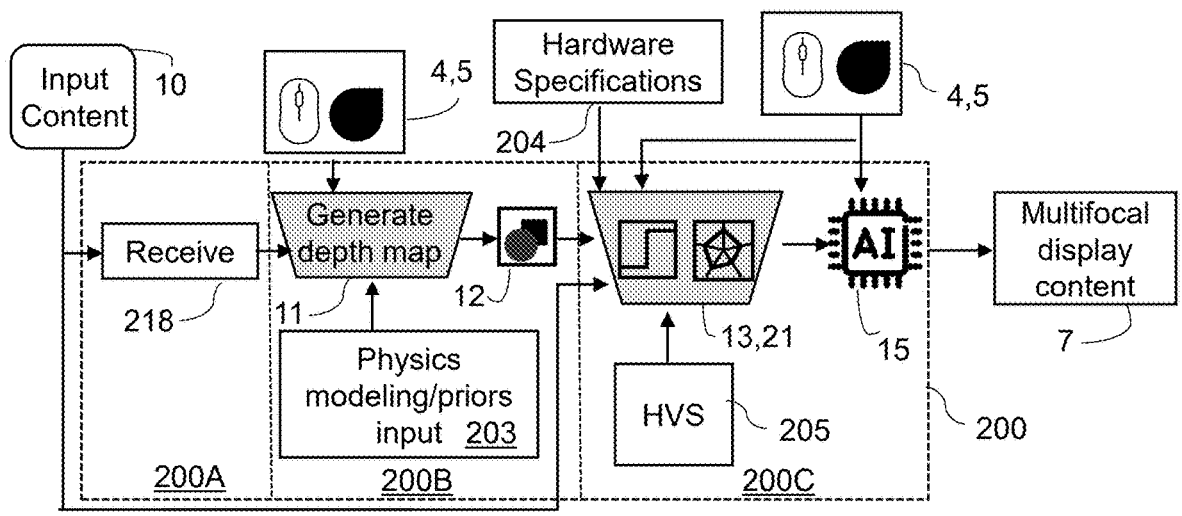

FIG. 2B illustrates a signal-processing diagram with a computational module 200 for processing input content and producing multifocal display content. In some embodiments, the computational module 200 comprises a set of computational modules, 200A (which may take in or receive 218 the input content 10), 200B, and 200C, wherein the first computational module 200A receives the input visual content 10 and processes it to make it manipulatable by ensuing modules. The input content 10 is input into a function 11 that outputs a depth map 12. The nature of this function 11 depends on the type of input content and the routine used to extract the depth information. For example, the function 11 may use a neural network. In some embodiments, the function 11 uses a segmentation function, object detection function, or other computer-vision function to identify extended objects in the input content and assign depth values to them. In some embodiments, the function simply reads depth information that is already part of the input content 10, as would be the case if the input itself contains a depth map.

Note that any computational modules in all of the following embodiments may comprise a set of computational modules, similar to what is shown in FIG. 2B.

The function 11 that produces the depth map 12 also, in some embodiments, takes in user input 4 or input from a sensor 5. For example, such inputs may include user-chosen parameters for the function 11, selections of the types of functions to implement, a course user-determined depth map that is refined by the function 11 iteratively, and the like. The function 11 in some embodiments also takes in physics modeling/priors input 203. The information here includes knowledge of the input content 10, knowledge of the recording method of the input content 10, knowledge of the illumination of the scene in the input content, and the like. The physics modeling includes physical laws that govern lighting of the scene (e.g., the rendering equation, the material reflectance properties of the scene), whether the scene is sparsely populated, whether this is multi-path interference, whether the scene is a natural image (and therefore possesses natural-scene statistics), and the like.

The depth map 12 and the input content 10 are then input into a set of functions, such as a thresholding function 13 and an optimization routine 21. These functions use the depth map to convert the input content so that it is suitable for a particular viewing experience or a particular display system. For example, in some embodiments the target display system is a multifocal display system with N focal planes, and the thresholding function 13 assigns every pixel in the depth map a value of 1, ..., N and subsequently assigns every part of the input content 10 associated with each respective depth map pixel to be displayed on the respective focal plane of the multifocal display system. In some embodiments the thresholding function 13 is an adaptive thresholding function that dynamically changes the threshold values. In some embodiments, the optimization routine 21 adjusts the resulting thresholding or assigns a part of the input content to the multiple focal planes using some relationship, such as a nonlinear weighting function, a linear superposition, and the like. In some embodiments, HVS parameters 205, hardware specifications 204, or user input 4 or input from a sensor 5 are input into these functions to impact the input/output characteristics.

In some embodiments, the optimization routine uses physically accurate modeling for perspective correction, intensity calibration, color calibration, parallax correction, and the like. In some embodiments, the optimization routine uses HVS information display system information for color correction, intensity correction, temporal profiling, bandwidth optimization.

In some embodiments, the result is sent into an AI module 15 which may generate new features in the content. For example, in some embodiments, it adds textures, physical effects, new objects, or annotations to be displayed. The result is a multifocal display content 7 that is displayed on a display system. In some embodiments, user input 4 or input from a sensor 5 are used to modify the AI module 15. For example, the user input 4 may be a prompt for a generative AI routine.

Figure 2C:
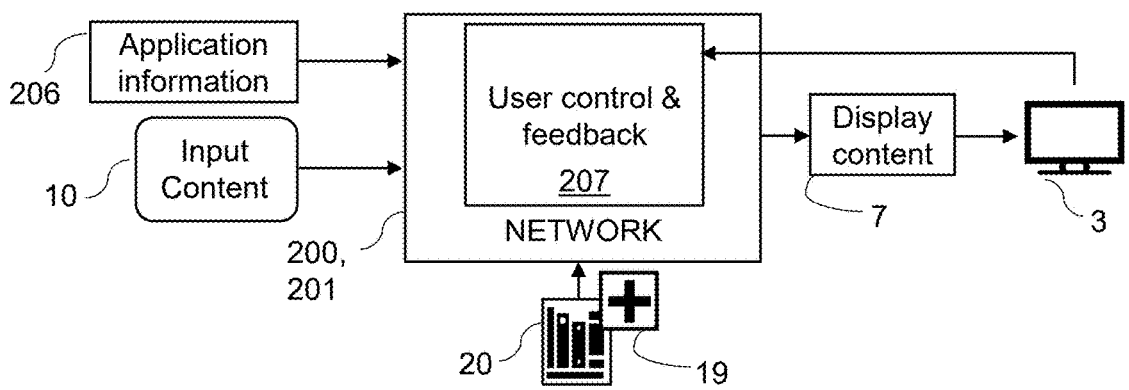

FIG. 2C is an embodiment of the conversion system with a computational module 200 that produces multifocal content from input content whereby the user of the conversion system or of the display system directs a substantial portion of the conversion. An input content 10 and application input 206 are input into the network 206. The application information in some embodiments is a set of parameters that describe the use or target application of the resulting display content 7. For example, the target application may be a video game, a medical imaging environment, a scientific imaging environment, a simulation training environment and the like. The application information 206 is used to modify the parameters of the network 201, which may also take in a (user-defined) library 20. In converting the input content 10, the network 201 is modified by user control and feedback information 207. The user control and feedback information is non-automatic changes in the network properties that influence the resulting display content 7 that is produced. In some embodiments, the user control and feedback information 207 is determined by a user who is observing the resulting multifocal image. In this embodiment, the conversion process is more interactive.

In some embodiments, the depth information is not physically accurate but highlights various features of the input content 10. For example, a user-defined library in some embodiments includes an object recognition function that identifies specific extended objects in the input content and relegates those to a different focal plane, even if the resulting monocular depth is not physically correct. This serves to enhance certain desired features of the input content. In some embodiments, the user-defined library includes an artistic or stylized rendering or ray tracing module that serves to use the input content to produce new output content in a stylized fashion. Applications include medical imaging, scientific imaging, teleconferencing, simulation training, gaming environments, content creation, and the like. For example, the library may be a gaming library, or a teleconferencing library, or a diagnostic imaging library, with certain functions or routines specific to those applications. In some embodiments, the conversion is real-time for use in certain of these applications. In some embodiments, the user adjustments come in the form of input from sensors, gesture cameras, or other input devices.

Figure 2D:
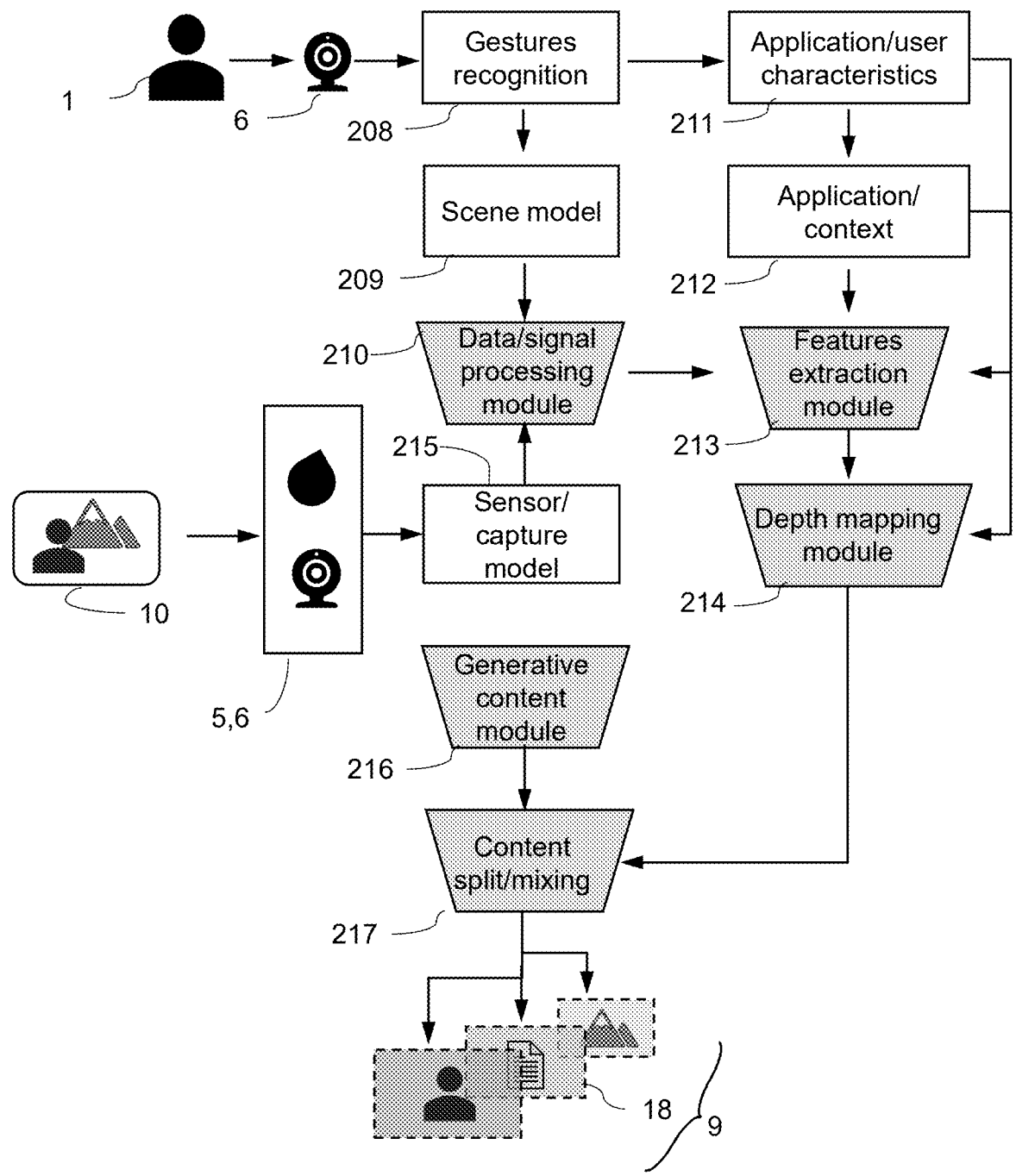

FIG. 2D illustrates a flow diagram that takes in knowledge of the recording or rendering of the input content. An input content 10 is recorded by a camera 6 and/or sensor(s) 6, and the system uses a capture model 205 as input, in addition to the content itself. A user 1 of the conversion system or of a virtual display system that displays the resulting converted display content may interact with the conversion system by way of a camera 6 that provides gesture recognition 208 of the user. The gesture recognition 208 and the scene model 209, along with the sensor/capture model 215, are input into a data/signal processing module 210, which formats the data and sends it to a features extraction module 213. The features extraction module identifies certain pre-determined features of the scene embedded in the input content 10. For example, it may identify certain shapes, motions, effects, optical properties, or electronic/pixel properties. The features extraction module 213 also takes as input the application/context 212 of the scene and of the user-desired application/characteristics 211. These data are then input into a depth mapping module 214 which produces the multifocal content by separating the input content 10 and/or mixing it in a content split/mixing block 217. In some embodiments a generative content module 216 adds features to the content, such as an annotation 18, The final result is a multifocal virtual image 9.

Figure 3A:
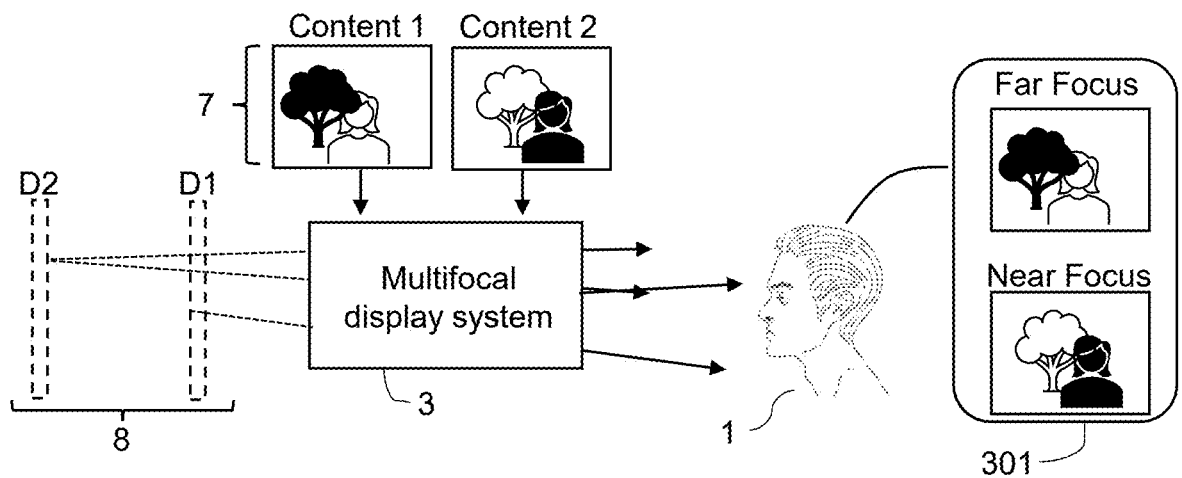
FIGS. 3A through 3G shows a set of example virtual display systems that can display the resulting converted content.
Figure 3B:
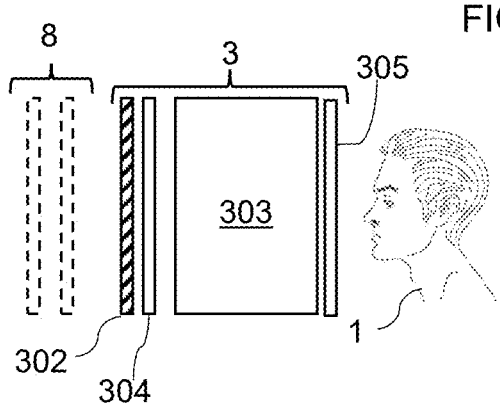

FIGS. 3A through 3G illustrate nonlimiting examples of display systems that display the resulting display content produced by the disclosed mechanisms. FIG. 3A shows a generic display system 3 which is a multifocal display system. For an N-layer multifocal display system, there are N focal planes. Each of the focal plane receives display content 7. The number N may any natural number. For example, it may be 2, 3, 4, 5, 6, 7, or 8. A viewer 1 of the system is positioned to receive light from the system and sees virtual images 8 corresponding to the display content 7. In some embodiments, the virtual images collectively form a multifocal virtual image. The viewer 1 perceives three dimensionality by accommodating his eye to the different focal plane. For example, the viewer accommodates to a far focal plane D2 or a near focal plane D1 and has a depth perception 301 of a scene.

The hardware implementation of the multifocal display system takes on different forms. For example, in FIG. 3B, a cavity-based display system 3 uses depth modulation to propagate the light within a field-evolving cavity 303 to change the path length of the light and therefore the monocular depth of the virtual images 8. In some embodiments, the virtual images collectively form a multifocal virtual image. In some embodiments, a display 302 emits light into the cavity 303. In some embodiments, the display system has pre-cavity optics 304 or post-cavity optics 305 to impact a property of the light. In some embodiments, one or more components of the display system 3 is modulated in time. In some embodiments, there are a plurality of displays each emitting light corresponding to one or more display contents, such that the light corresponding to each display content travels a different path and results in a different focal plane. In some embodiments, one or components is curved or has optical power to produce a curved focal plane.

Figure 3C:
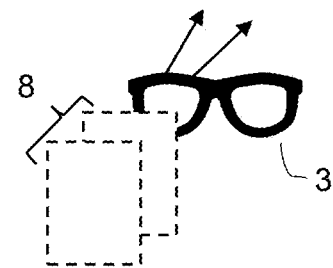

FIG. 3C shows a head-worn display system 3, which may be a pair of augmented-reality (AR) glasses. In some embodiments, this type of display system uses waveguiding optics to guide the display content along different paths producing virtual images.

Figure 3D:
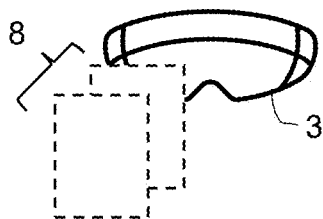

FIG. 3D shows a version of a display system 3 that is a headset or head-mounted system. Virtual images 8 are produced. This display system may use time-varying components, such as switchable lenses or screens to provide multifocal content. The multifocal content may be part of a VR, AR, XR, or MR environment.

Figure 3E:
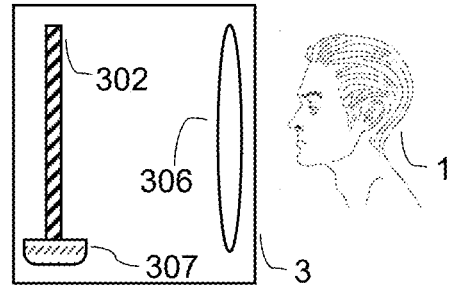
Figure 3F:
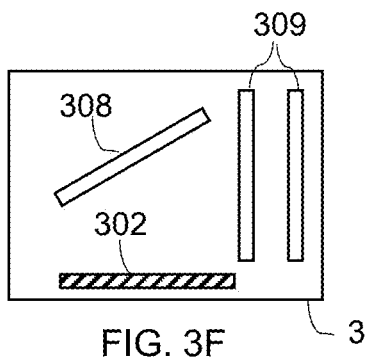

FIG. 3E shows a mechanism for producing a multifocal image. Here, a display 302 shows display content and is moveable in time by a mechanical actuator 307. The light then is transmitted through a lens 306 to be viewed by a viewer. The position of the display 302 is switched in time synchronized with the display content that is shown, such that a time sequence of display content is shown at a corresponding set of display positions. The position of the display relative to the lens 306 and the viewer 1 results in a set of different focal planes (where the distance s2 between the lens and the virtual image may be derived from the distance s1 between display 302 and lens 306 and the focal length f of the lens via $(1/s1)+(1/s2)=(1/f)$. In some embodiments, different mathematical rules are used to determine the appropriate depths. For example, the wavelength and/or optical aberrations play a role in some embodiments. In some embodiments, the lens 306 has a switchable focal length, such that its focal length f is a function of time f(t) that is synchronized with the display content. In some embodiments, the focal length is changed according to an eye gaze of the viewer 1.

In some embodiments, the display system 3 produces display content with diffuse screens. Display 3 that directs light to a reflector 308, which subsequently directs the light to a set of switchable screens 309. The screens act as projection-type screens to view the image, and the screen that is turned "on" corresponds to the position of the virtual image.

Figure 3G:
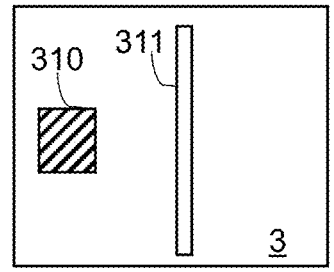

In some embodiments, like that shown in FIG. 3G, the display system 3 uses a light source 310, which may be a display, a laser beam scanner, or other type of light source. The light source passes through a holographic element 311, which may be a holographic optical element, a hologram, a diffraction-based grating, or other component that uses wave interference to produce virtual images. The light source 310 or the holographic element 311 change in time in some embodiments.

Generally, any property of light may be used to produce a multifocal image. For example, in some embodiments, the path length, the temporal switching, the polarization of the light, or the optical power are used to produce a multifocal image.

Figure 4A:
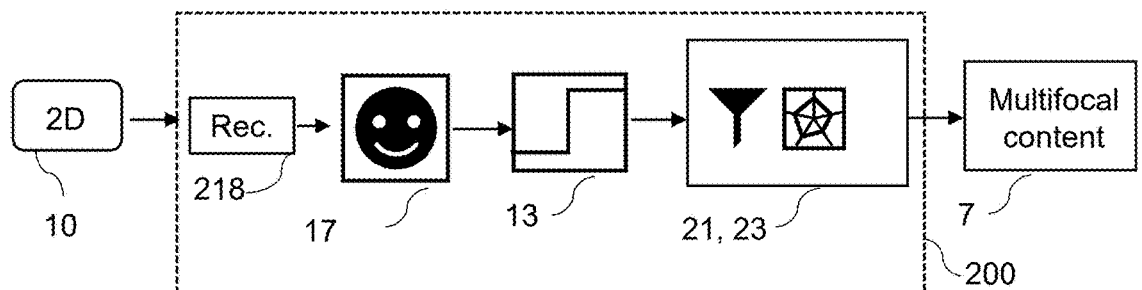
FIGS. 4A through 4L shows a set of flow diagrams that describe the algorithms for taking different types input visual content, extracting depth information, and using the extracted depth information to produce output visual content, which, in some embodiments, is multifocal display content.

FIGS. 4A through 4L illustrate a set of embodiments of a conversion system for taking in various types of input content and produce output content that may be shown as a multifocal image. In some embodiments, the functions and operations are performed by a computational module, or are included in a computational module, which may also include extra data, parameter information, training data, dictionaries, and libraries. In FIG. 4A, the input content 10 is a 2D image content, which may be a color image or video (e.g., an RGB image, a 2D cartoon or animation, or a video), a monochrome image or video, a grayscale image or video, and the like. In some embodiments, the input enters a computational module 200 and is received by a receive block 218. The input passes through a segmentation function 22 to identify certain features of the content. For example, the segmentation may separate a first feature to present as a first depth and a second feature to present as a second depth. The output of the segmentation function is a set of objects or pixels of the input content, where each object or pixel is assigned a depth value. The result passes through a depth threshold function 13, which bins the depth values into a set of depth ranges. Each depth range corresponds to a single layer of the multifocal content 7, which is the output of the conversion. In this way, the pixels or objects that comprise the input content 10 are assigned for display on different layers of the multifocal content.

Figure 4B:
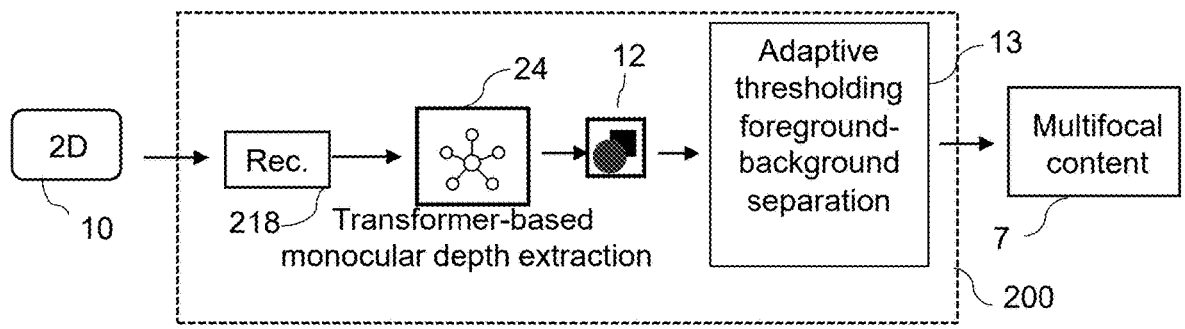

In FIG. 4B the input content 10 is 2D, as it was in FIG. 4A. In this case, a computational module 200 includes a receive block 218 and a neural network 24 that produces a depth map 12. In some embodiments, the neural network is a Transformer-based network. In some embodiments, the neural network performs monocular depth extraction. The depth map 12 is then input into a thresholding function 13 which may be an adaptive thresholding function. In some embodiments, the adaptive threshold separates the depth map into a foreground depth and a background depth. In some embodiments, the adaptive thresholding algorithm has a dynamic threshold that changes from frame to frame of a movie, based on the content of each frame. The output is a set of depth layers that serve as multifocal content 7. In this way, the pixels or objects that comprise the input content 10 are assigned for display on different layers of the multifocal content.

Figure 4C:
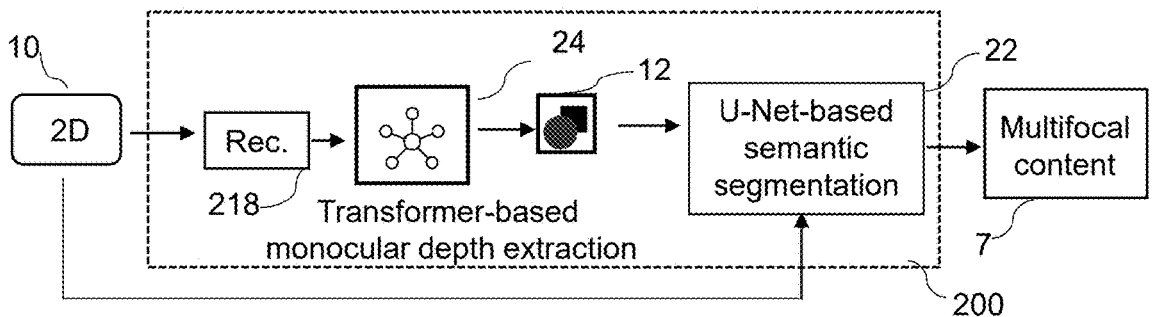

In a similar embodiment, shown in FIG. 4C, the input content 10 is 2D content enters a computational module 200, is received by a receive block 218, and passes through a similar transformer-based monocular depth extracting neural network 24 to produce a depth map. In some embodiments, a segmentation function 23 acts on the depth map and on the input content 10. In some embodiments, the segmentation function is a U-Net-based semantic segmentation. In some embodiments, the output is a set of objects of the original content that are presented on a set of depth planes in a multifocal content 7 output.

Figure 4D:
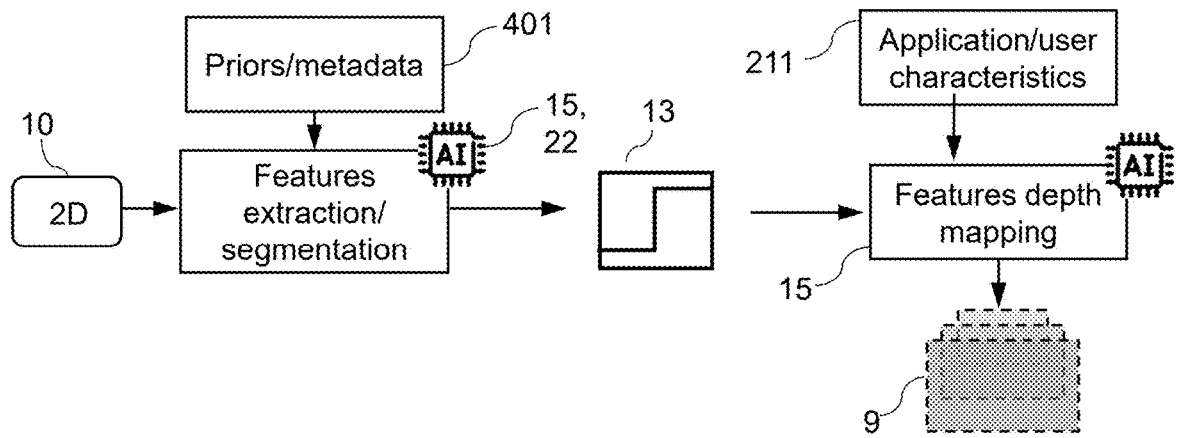

In FIG. 4D, the input content 10 is 2D content. This content is fed into an AI module 15 to extract features and segment the content. In some embodiments a priors/metadata block 401 is also input into the AI module 15 to impact the data, which is fed into a thresholding block 13. The output of this block enters the features depth mapping block, which may be another AI module 15. This module also takes in application/user characteristics 211 to produce the display content that leads to a multifocal virtual image 9.

Figure 4E:
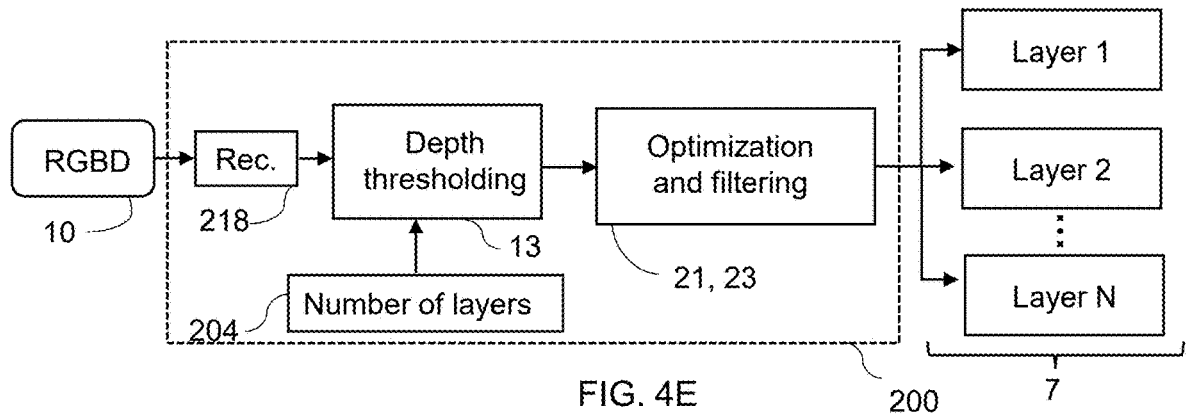

In FIG. 4E, the input content 10 includes a depth map and enters a computational module 200 and is received by a receive block 218. In some embodiments, it is a red-green-blue-depth (RGBD) image or video. In some embodiments, the input may be produced by a time-of-flight camera or a stereo camera. The input content 10 passes through a depth thresholding function 13, which operates on the depth channel of the RGBD content. In some embodiments, the thresholding is determined by an input that determines the number of layers 204 of the resulting multifocal content. The content then passes through optimization and filtering functions 21, 23, to produce N layers of multifocal content 7, wherein the content includes pixel information or objects from the original input visual content 10.

Figure 4F:
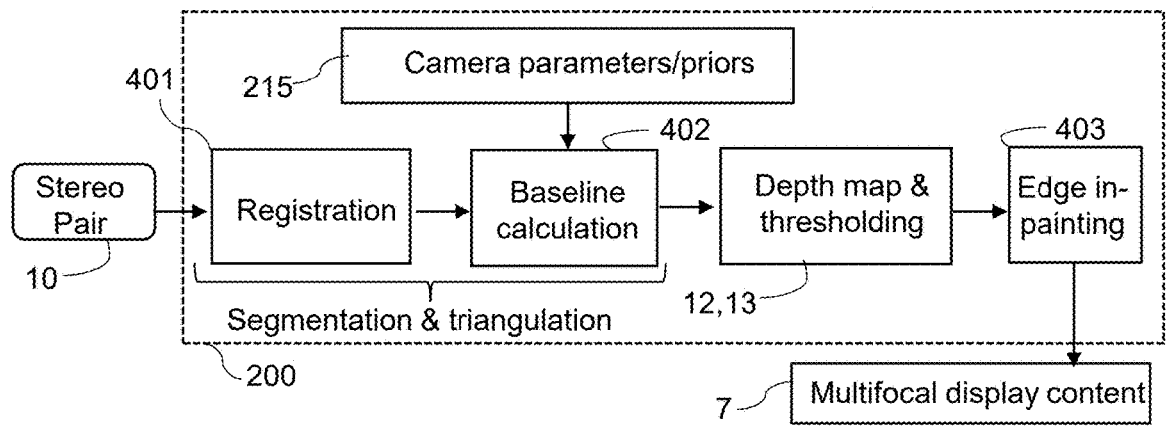
Figure 4G:
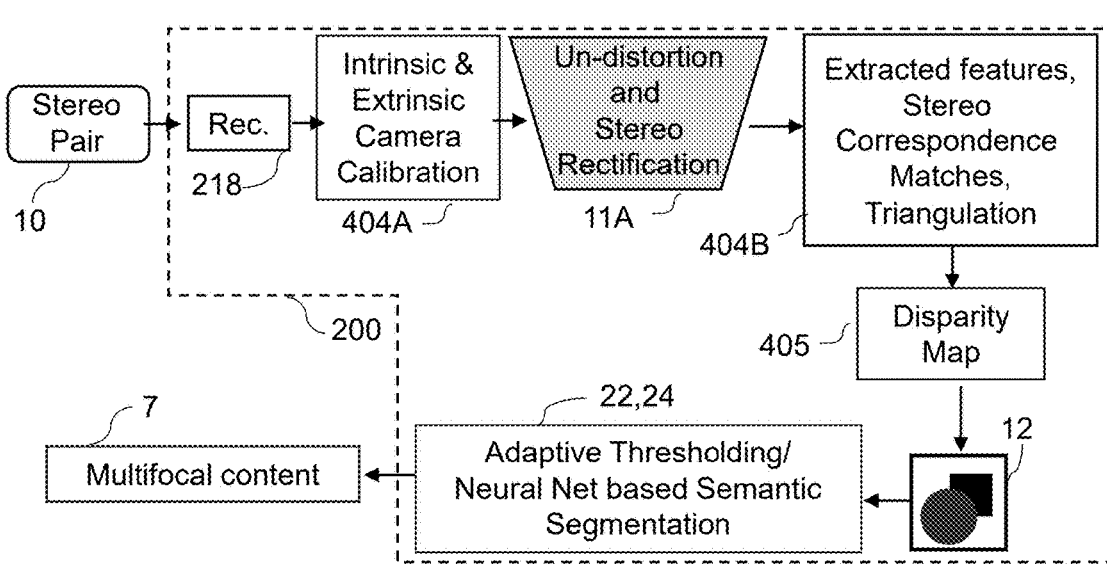

FIG. 4F shows an embodiment in which the input content 10 is a stereo pair, as may be the case for virtual reality (VR) content, whereby two images or videos are produced, one visual content for each eye. The content enters a computational module 200. In some embodiments, the geometry of the environment in the stereo pair is determined through segmentation and triangulation. This involves a registration function 401 comparing the pair of images (or each from of a video) and identifying corresponding points in the pair, i.e., which pixel positions for the pair of images correspond to the same scene point. In some embodiments, a prior information input 215 inputs into a baseline calculation function 402 properties of the camera or of the scene, e.g., the focal length of the camera, the baseline between two cameras, and the like. A resulting depth map 12 is produced which passes through a threshold function 13. In some embodiments, the edges of the depth map must be filled in because of gaps in the stereo pair. For example, a certain color value may be assigned to edges. In some embodiments, an AI module generates content based on scene understanding. The output is multifocal display content 7 that contains information about the input visual content, including the extended objects themselves. In some embodiments, the properties of the input visual content is modified or enhanced.

In any of the embodiments, functions may be executed in parallel by the same computational module. In some embodiments, the ordering of the functions in interchanged based on an optimization principle. In some embodiments, the thresholding is adaptive thresholding (e.g. using Otsu's method), a U-Net architecture that takes as input both the extracted depth map and the original input content (e.g., a 2d image), or an end-to-end transformer network that produces both the segmentation and the depth map (e.g., based on monocular depth extraction), and the like. Segmentation in some embodiments is executed before the depth map is extracted.

In FIG. 4G a stereo pair is again the input content 10. This content enters a computational module 200, is received by a receive block 218 and enters into a computational block 404A which uses intrinsic and extrinsic camera calibration in a first function 11A to undistort and rectify the stereo pair that is used to produce extract features, compute stereo correspondences, and triangulate the correspondences based on epipolar geometry and output this feature information 404B. The undistort and rectify functions are examples of geometric warping functions. Stereo rectification is a geometric warping function that projects images onto a common image plane in such a way that the corresponding points have the same row coordinates. In some embodiments, the undistort function is a geometric warping function that corrects distortion in the images, especially differences in the image due to different camera or rendering locations. In some embodiments, the undistort function corrects for barrel or pincushion distortions. The result is a disparity map 405, which is used along with the camera baseline the from extrinsic calibration to produce the depth map. The disparity map is a map that shows the differences in the positions of corresponding objects from the respective camera locations. The depth map 12 that is output undergoes adaptive thresholding or neural net-based semantic segmentation 22, 24 (or more straightforward thresholding) to produce multifocal content 7. In some embodiments, the multifocal display content 7 shows the content of the input visual content with similar or identical depth perception but instead uses monocular depth cues (accommodation of each eye), whereas the stereo pair original relies only on binocular depth cues (vergence), such that the multifocal content eliminates the vergence-accommodation mismatch.

Figure 4H:
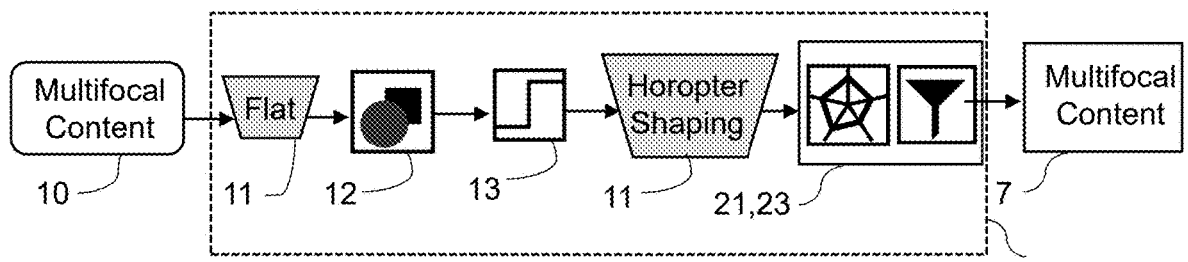

FIG. 4H is an example embodiment whose input content 10 is multifocal content that enters a computational module 200. The purpose of this embodiment is to convert a first multifocal content into a modified output multifocal content 7. The input content 10 is input into a function 11 that flattens the multifocal content to produce a depth map 12. The flatten function in some embodiments simply associates with each corresponding focal plane of the multifocal content a depth value for any nonzero pixel in that focal plane. If multiple focal planes have a nonzero pixel value for identical pixel coordinates (i.e., a multivalued depth for a single position in the content), then a subfunction must be used to assign a depth value. For example, the subfunction may be the maximum subfunction (taking only the brightest pixel), an (possibly weighted) average subfunction, a subfunction that corresponds to any of the shader or other operations in FIGS. 7A through 7G, and the like.

The depth map 12 then undergoes a thresholding function 13 (or some equivalent such as adaptive thresholding/neural-net-based semantic segmentation. The content in some embodiments passes through a horopter shaping function 11, which serves to (a) identify the number of focal planes, (b) the curvature (if any) of those focal planes, and (c) the comparison between and correspondence of those focal planes to the HVS. In some embodiments, the focal planes may be curved according to a human horopter via a horopter shaping block 205A. The content then undergoes optimization 21 and filtering 23 to output modified multifocal content 7, which may have a different set of parameters as the input content. For example, the input content 10 may have N=1, 2, 3, 4, 5, 6, 7, or 8 focal planes, and the output content may have N±n, where n=0, 1, 2, 3, 4, and the like, provided the number of focal planes is not zero or negative.

Figure 4I:
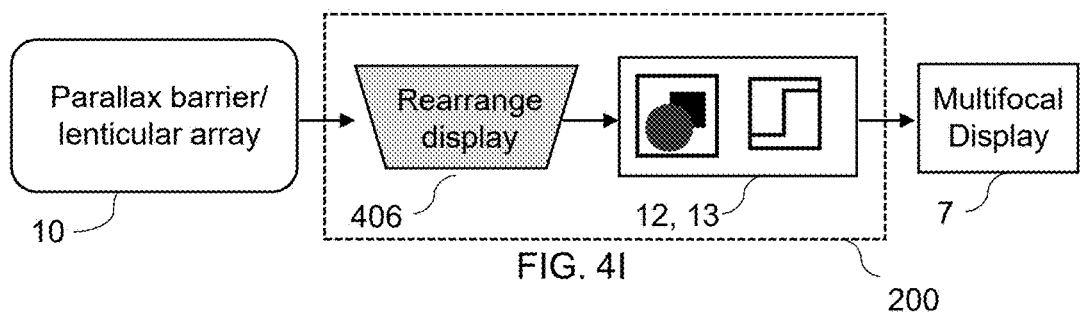

FIG. 4I is an embodiment that has as input content 10 parallax barrier or lenticular array content entering a computational module 200. This would be an example that converts autostereoscopic content into multifocal content. The content first enters a display rearranging function 406, which rearranges individual pixel values of the original content. For example, in a 1D parallax barrier with two interlaced images, this function sorts every odd column together to form a first image and every even column of pixels into a second column. In some embodiments, the two images form a stereoscopic pair than can subsequently enter the computational module 200 of any of FIGS. E through G. The present computational module produces a depth map 12, which undergoes a segmentation function 13 to produce multifocal display content 7.

In some embodiments, the input visual content is an anaglyph, and the display rearranging is computed by first color filtering the anaglyph by a first color to create a first image, color filtering the anaglyph by a second color to create a second image, and so on.

Figure 4J:
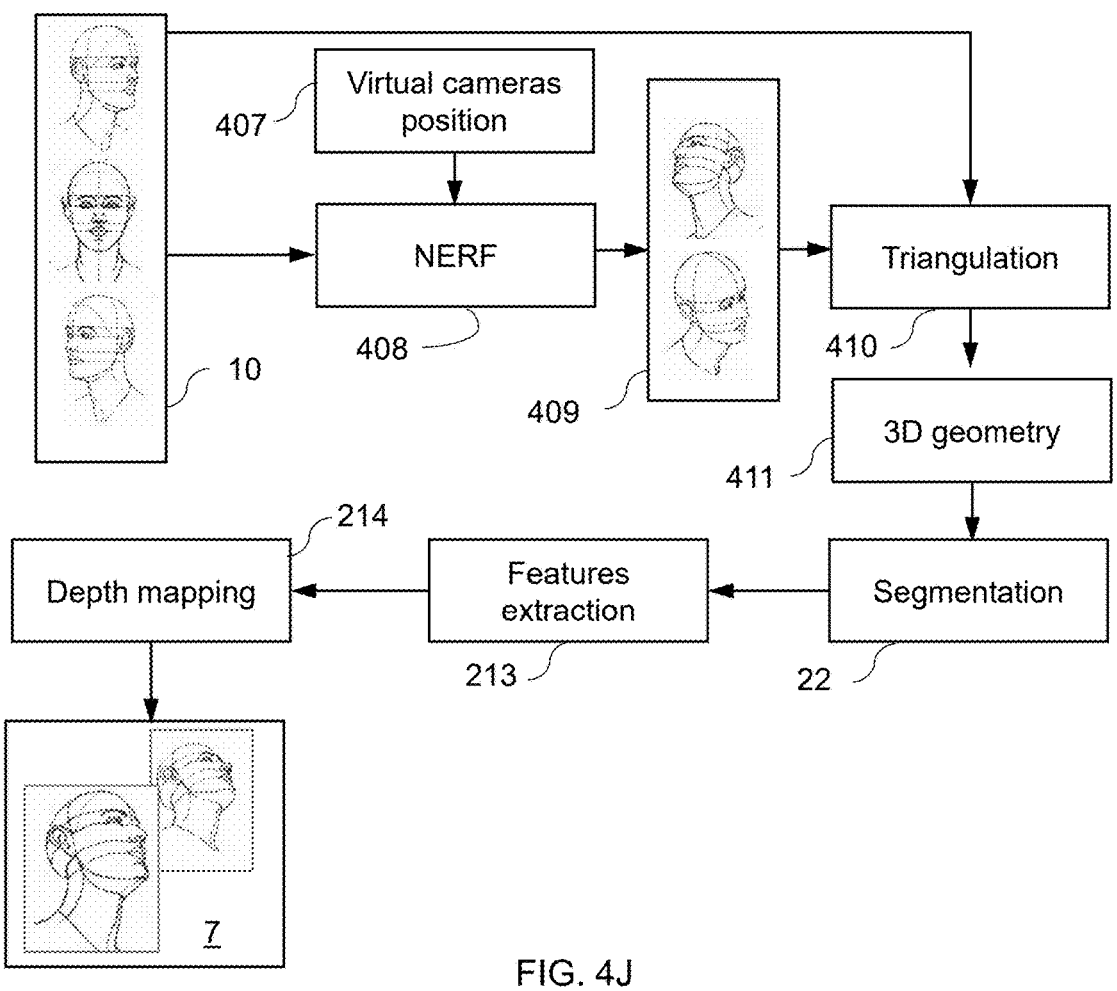

FIG. 4J is an example embodiment in which new views may be synthesized before producing multifocal. The input content 10 is a collection of a scene recorded from multiple viewpoints. In some embodiments, the collection is a collection of videos. The input content 10 enters a Neural Radiance Field (NeRF) neural network block 408 which outputs new content 409. The input to the NeRF block 408 also includes virtual camera positions 407 (or virtual viewing positions). The new content 409 in some embodiments enters a triangulation step 410 along with the input content to output the 3D scene geometry 411. In some embodiments, this is not necessary, and the NeRF block 408 already contains information about the 3D scene geometry. The 3D scene geometry includes depth information about the scene. Then the information is send into a segmentation block to identify certain features or extended objects. Then the content is sent through a features extraction block 312, which may be an AI module that highlights certain features of the segmented extended objects. Last the information is sent into a depth mapping block 214, which produces multilayer output content 7 from synthesized viewed.

Figure 4K:
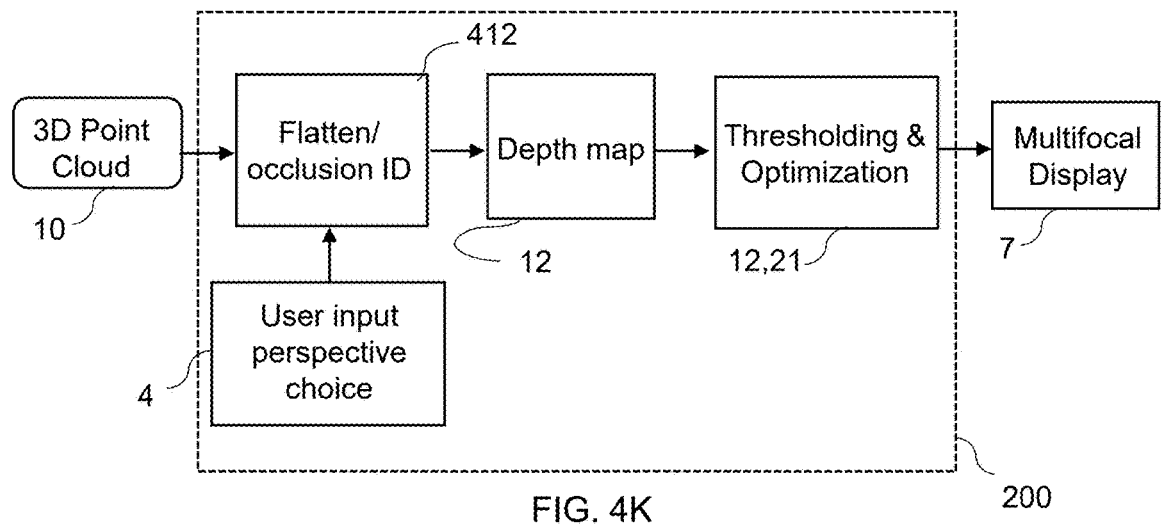

FIG. 4K is an embodiment whose input content 10 is a 3D point cloud. In this embodiment, the input content 10 is sent into a flatten/occlusion ID block 412. In this step, the a user-selected input perspective choice 4 is used to determine the correct perspective that should be visible in the final virtual image. The output is a depth map 12, which is sent into thresholding 12 and optimization modules 12, 21, to produce a multifocal display content 7.

Figure 4L:
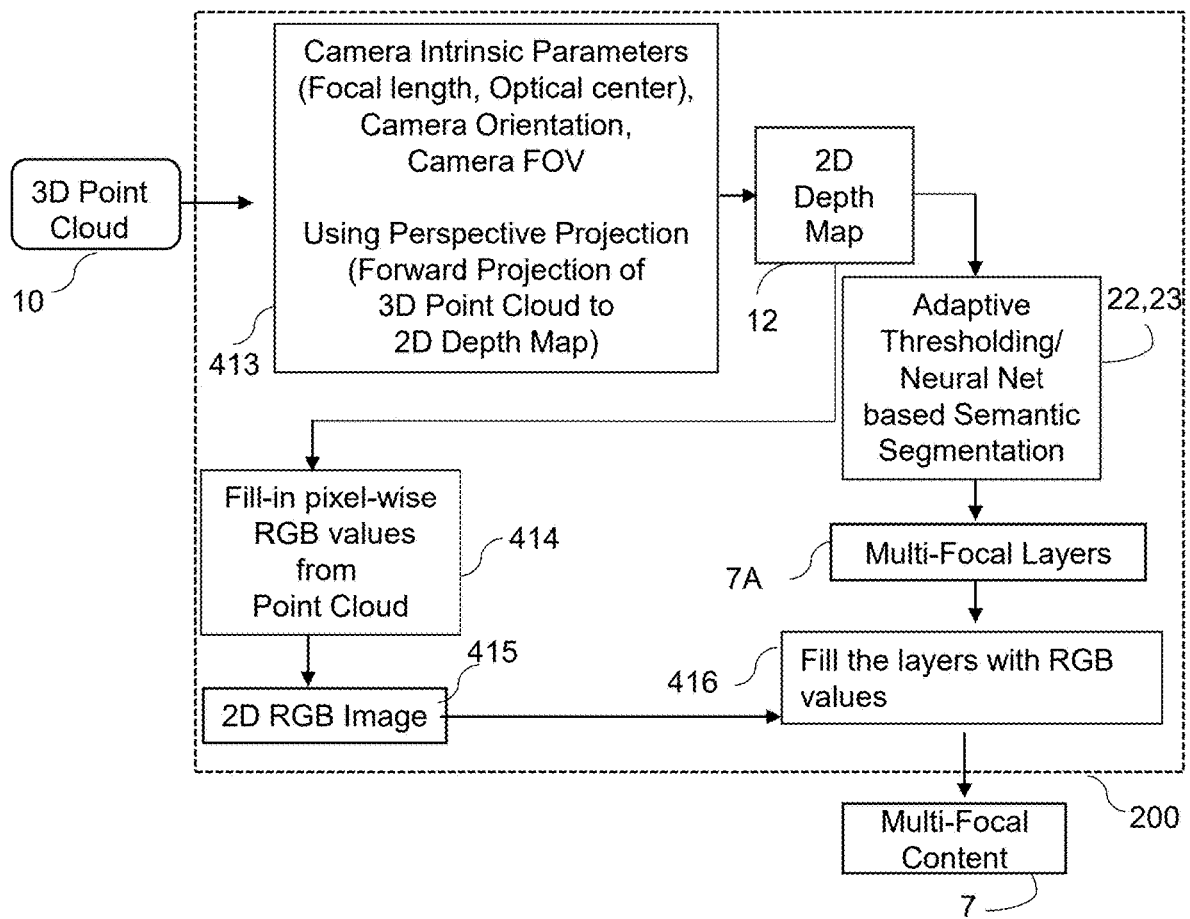

FIG. 4L is another example of input content 10 being a 3D point cloud. The input content 10 is send into a computation block 413 that uses camera properties and intrinsic parameters (including, e.g., focal length, optical center, camera orientation, camera FoV) and computes the projection of the 3D points onto a 2D depth map 12. The depth map 12 is sent into sent into an adaptive thresholding 223, and neural network 23 block for semantic segmentation to produce multifocal layer content 7A, which determines which pixel (point in the point cloud) belongs to which focal plane. In parallel, the depth map 12 is used in a subsequent block 414 to fill in pixel-waves RGB values from the point cloud, i.e., to produce an RGB image 415 that is the correct camera perspective image of the point cloud. This information is sent into a block 416 after the multifocal layer content 7A to fill the layers with RGB values, i.e., to give the multifocal content the correct color value for each pixel, which results in the final multifocal content 7.

Segmentation functions may be applied in top-view scenes or arbitrary scenes where depth information does not exist, as may be the case for a depth-less rendering or artistic content.

Stereo-to-multifocal involves in some embodiments the following: inputting intrinsic parameters (focal length, optical center) and extrinsic parameters (rotation and translation); stereo rectification (geometric distortion correction/epipolar geometry) to ensure corresponding points lie on the same scan line, to simplify correspondence searches; feature matching (using feature matching descripts for correspondence points); a disparity calculation to calculate the horizontal shift between corresponding points in the image; and computing a distance or depth based on the disparity map. The depth map generation then follows. Afterwords, any of the segmentation functions may be used like thresholding or a transformer network.

In converting 3D point cloud content into multifocal content, several embodiments have similar steps. In some embodiments a camera calibration is known or input into the conversion system. This includes intrinsic parameters (focal length, optical center) and extrinsic parameters (rotation and translation of the camera). In these embodiments, a transformation matrix is applied to align 3D points in the camera's coordinate system, which are further transformed to the Image coordinates. In some embodiments, this matrix is a 3×4 Perspective Projection matrix for world-to-image transformation, which contains a rotation, a translation and an intrinsic matrix for Camera's orientation, position and intrinsic parameters. In some embodiments, the coordinates are further modified to account for perspective correction. Because multiple 3D points may correspond to the same image pixel, the depth of the points is noted, and the closed depth is kept. The other geometric points are occluded by the nearest point. The value of depth of each closest point for each pixel composes the depth map for further processing. The RGB image (or video) is also created by filling in the RGB values for each point.

Figure 5A:
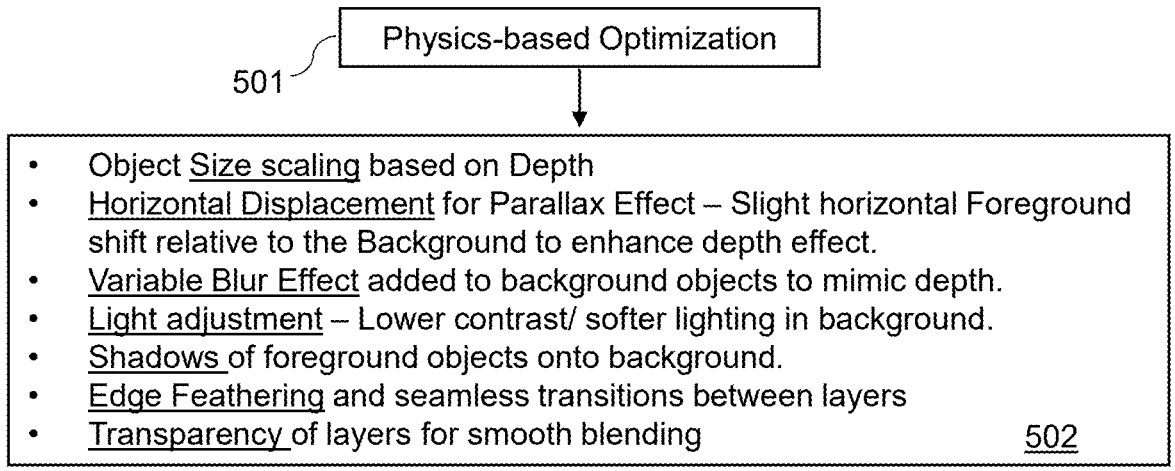
FIGS. 5A through C depicts a set of charts that outline different ways to optimize the depth extraction methods.
Figure 5B:
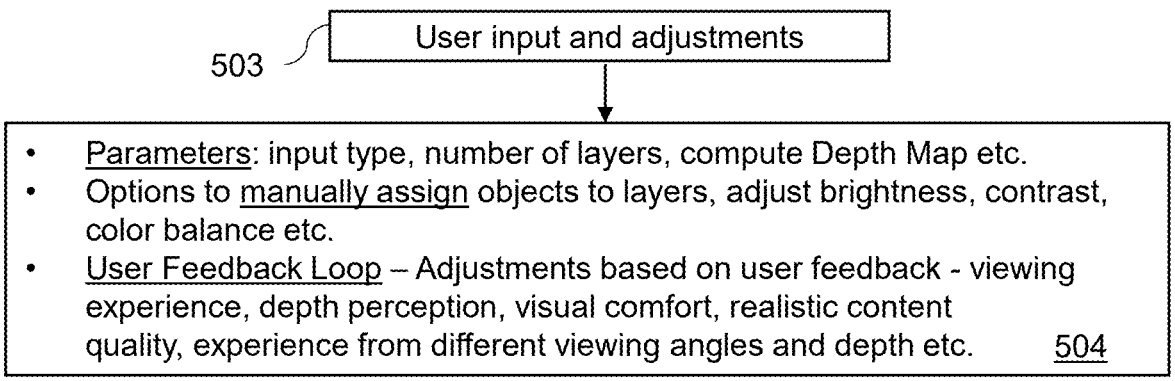
Figure 5C:
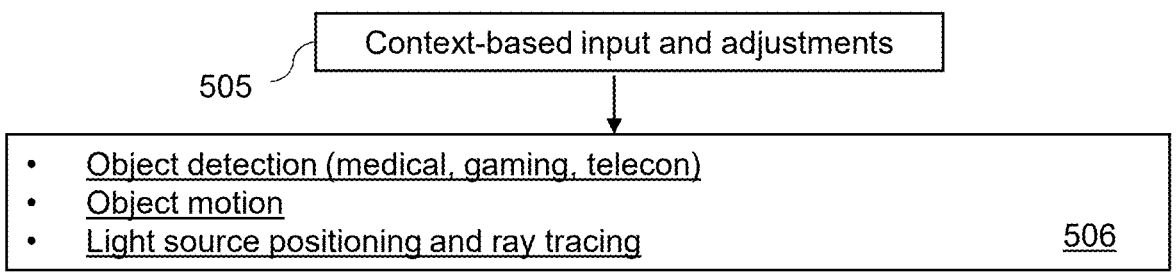

FIGS. 5A through 5C tabulate the various categories of refining or optimizing the multifocal display content. FIG. 5A shows a list a physics-based optimization category 501. The physics-based optimizations 502 are nonlimiting. In general, however, this category uses understanding of the physics of the scene in the input content, the physics of the HVS, the vision of the recording process of the scene, the illumination and lighting conditions of the scene, the physics of light propagation within the scene, and the physics of light propagation in the display system that displays the multifocal content. In some embodiments, a viewer of the content provides feedback to the conversion system.

FIG. 5B shows a list of the user input and adjustments category 503. The user input and adjustments list 504 is nonlimiting. In some embodiments, the HVS includes personalized data such as a viewer's eyeglass prescription. In some embodiments, the conversion system requests feedback from a user of the conversion system during the conversion itself. In some embodiments, the input requested is one or more parameters of the display system.

FIG. 5C shows a list of the context-based category 505. The context-based optimization 506 are nonlimiting. In some embodiments, computer vision functions are used to detect objects or motion and adjust the conversion process based on those properties. In some embodiments, the illumination or perspective of the scene in the input content is adjusted dynamically, e.g., through real-time rendering, to produce new views based on scene understanding, e.g., to bring a viewer's attention to an obfuscated part of a scene.

Figure 6:
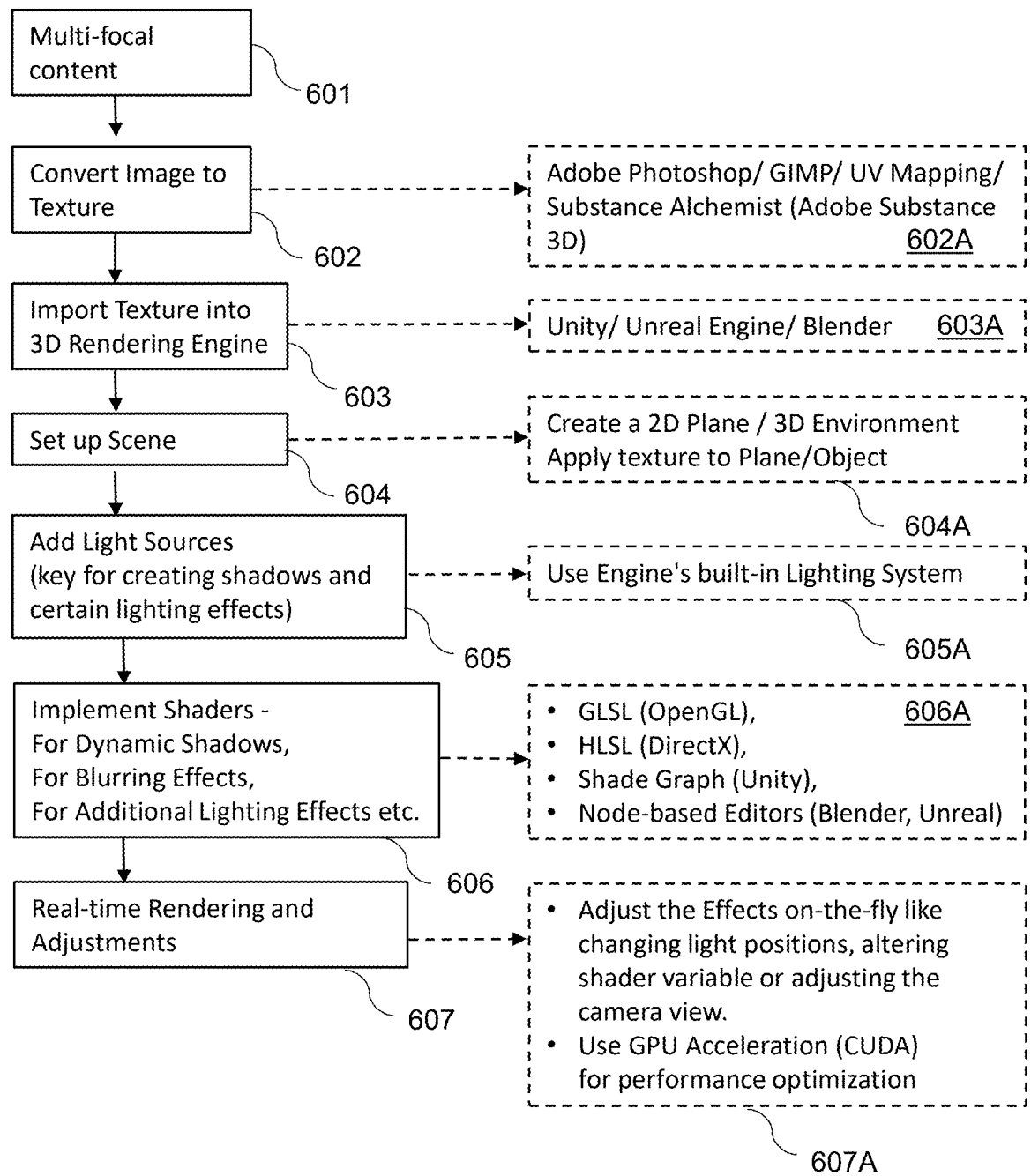
FIG. 6 depicts a flow chart in which the calculations are optimized performance. In some embodiments, the optimization is for real-time performance

FIG. 6 shows a nonlimiting set of examples for rendering and for real-time ray tracing analogs of multifocal content generation. In some embodiments, the real-time ray tracing tools are used for teleconferencing, flight simulation or other simulation training, video gaming, or other shared visual environments. The general pipeline starts with some desired multifocal content 601, converts the imagery, extended objects, or subsections of the imagery into different textures 602 using photo- or video-editing tools 602A. The output is imported into a 3D rendering engine 603, which uses tools such as game engine tools 603A. Then, the a 3D scene is set up 604 using a tool block 604A that incorporates 2D planar texture applications. Then the lighting sources are added 605 to create shadows, multipath lighting, direct lighting, diffuse shading, specular shading, and the like. The lighting rendering tool 605A is typically a subpart of a game engine tool 603A. Then various shaders 606 are used to create different effects. This is completed in a coding environment 606A. Finally, as the scene changes dynamically, as would be the case in a video game, real-time rendering and adjustments 607 is completed, which may use real-time rendering tools 607A, that include GPU acceleration, on-the-fly relighting, and the like.

FIGS. 7A through 7H illustrate various methods of optimizing routines in the disclosed system. In any of these embodiments, the multifocal display content contains information about the input visual content, or extended objects in the input visual content, or modified versions thereof. In any of these embodiments, the various functions and operations are executed by a computational module. In some of these embodiments, for clarity, the depth map is already calculated and known, and the optimization step happens sequentially as a discrete step, but it may be implemented simultaneously with the depth map calculation, as part of an overall deep learning or neural network algorithm, and the like. In some embodiments an optimization routine is implemented before a calculation of a depth map to improve the performance of later steps. Note that the input visual content is not shown in these embodiments, but the output content that is produced is the result of the multifocal conversion of such content. In some embodiments, optimization routines are implemented iteratively with other functions. In some embodiments, any of these functions are combined or used sequentially in a single conversion.

Figure 7A:
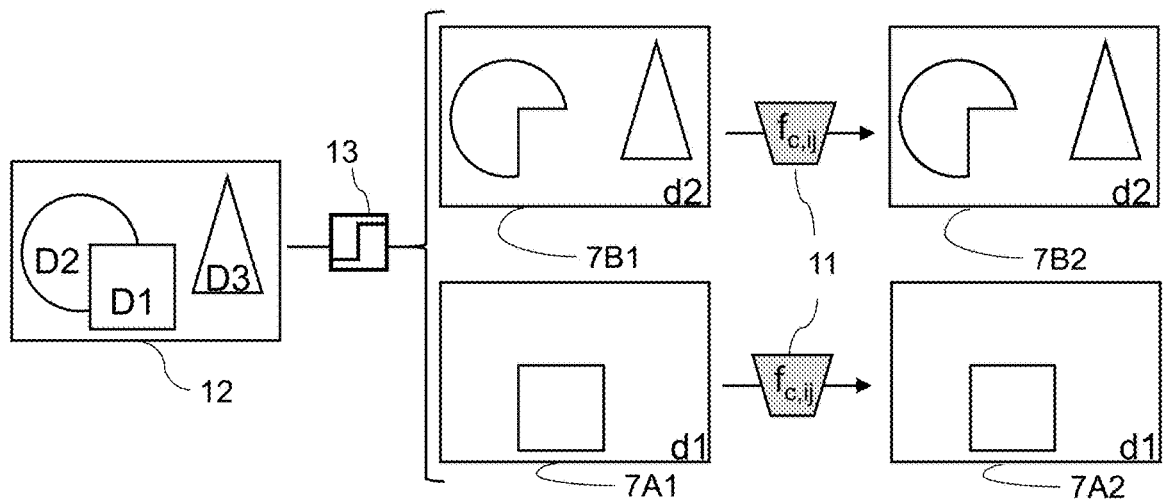

In FIG. 7A a depth map 12 passes through a thresholding function which producers initial display contents 7A1, 7B1 corresponding, respectively, to focal planes at depths d1 and d2>d1. The initial depth map 12 has objects with depth values D1, D2, and D3, with D1<D2<D3. These are preliminary focal planes and could be used without any optimization routines. In this example, each of the display contents 7A1, 7B1 pass through a respective function 11 to produce modified display contents 7A2, 7B2, where the objects in the input visual content (not shown, but from which the depth map is produced or accompanied), are shown. These functions are correction functions to improve the resulting multifocal image based on physical properties. In some embodiments, the physical property is a property of the HVS. For example, in some embodiments, the functions change the color profile of the pixels or of the extended object to account for the longitudinal chromatic aberration (LCA) of the human eye. The LCA means different wavelengths (colors) are focused differently for a given accommodation state of the eye. A human depth perception cue relies on LCA, which manifests mainly around edges of objects. The functions 11 incorporate the dispersion of the eye lens, and the difference between the physical depths D1, D2, and D3; and the display depths d1 and d2. Essentially, the color function adds chromatic aberration to account for discrepancies in the depth map. The LCA is given by $$D(\lambda) = 2.071 - \frac{633.43}{\lambda - 214.10},\qquad \text{Eq. 1}$$

where λ is the wavelength of the light (in nanometers) and the in-focus wavelength is 520 nm, and D(λ) is the refractive error in diopters. In some embodiments, the function is intensity based and changes the intensity of pixels or extended objects. In some embodiments, the function is blur- or defocus-based and may be, e.g., a convolution with a blur kernel, or with some function that represents the aberrations of the eye (the eye's point spread function). In some embodiments, the functions are constrained by natural image statistics. In some embodiments, the aberrations of the eye that are modeled with the function include spherical aberration, astigmatism, and the like.

In some embodiments a function $f$ takes in the red (R1), green (G1), and blue (B1) color channels of a pixel; and the preferred depth d associated with that pixel; and it outputs a new red, green, and blue color channels (R2, G2, B2) for that pixel: $f(R1, G1, B1, d)=(R2, G2, B2)$. In this case, the wavelength, or color, corresponds to the specific triad of color channels. In some embodiments, the function depends on only the relative values of the color channels, e.g., the ratios R1/G1, R1/B1, or G1/B1. In some embodiments the function is an operator, such as a convolution operator. For example, in some embodiments, an operator function $f$ is a convolution or superposition integral of each color channel C1(x) (where "C" is any of R, G, or B; and "x" is a pixel coordinate, with a kernel ha (x), which is parameterized by the depth d, e.g., $$f\{C1,d\}=\int h_d(x-x')C1(x')dx',\qquad \text{Eq.2}$$

where the kernel may be a Gaussian function whose width is a function of d or the value of the color channel at that position (making the operator a more generic superposition integral rather than convolution).

In some embodiments, the function may simple scale the pixel intensity values depending on the desired distance. For example, the function $f$ acting on a pixel with intensity C (corresponding to either the independent color channels R, G, or B, or to the sum/grayscale value R+G+B) as $f(C)=C/d^2$. In some embodiments, the function is an increasing function of desired depth.

Figure 7B:
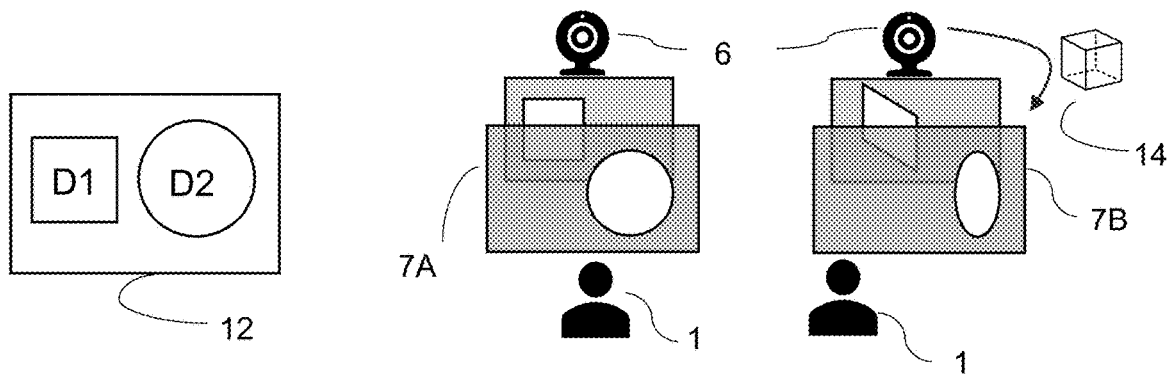

FIG. 7B shows an embodiment in which the optimization routine happens in real time based on feedback from a viewer of the display system. A given depth map 12 has objects at depths D1 and D2>D1. A viewer 1 of a multifocal display system sees a multifocal virtual image 7A with two focal planes, showing the information from the input visual content (not shown) from which the depth map is provided or computed. A camera 6 captures the position of the viewer's head. If the viewer shifts positions, the camera 6 sends this positional information into a geometric warning function 14 that changes the shape or size of extended objects in the display content. The geometric warping mimics perspective and parallax effects.

Figure 7C:
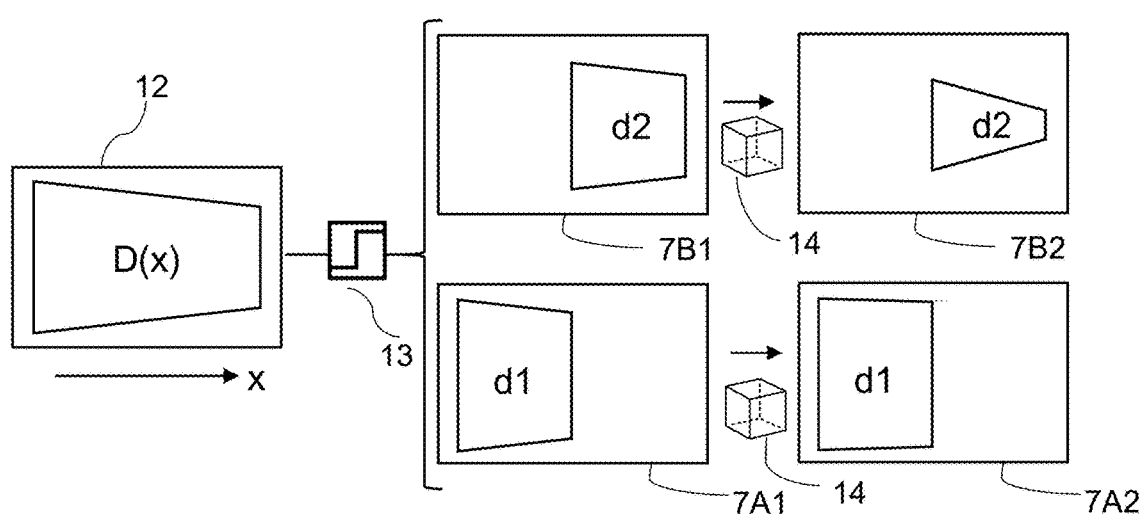

FIG. 7C shows a similar embodiment in which a depth map 12 may contain an extended object with a continuously varying depth profile D(x) that varies along a certain direction x. This is input into a thresholding function 13 that output two layers of multifocal display content 7A1 and 7B1 corresponding to focal planes at depths d1 and d2>d1 respectively. A hard threshold would simply divide the object into two parts and display a part on each focal plane. In some embodiments, these display contents are input into a geometric warping function 14 that modifies the shape of the two parts. The warping adjusts the perceived perspective of the object.

In some embodiments, instead of a hard threshold and a warping function, a given depth value in the depth map corresponds to a pixel or object having a depth in between the two focal planes. In such a case a blending function map add a first weighted value of the input content two a first depth plane and a second weighted value of the input content two a second depth plane, such that the overlapping focal planes drive the viewer's accommodation response to perceive depth in between the two focal planes.

In some embodiments the multifocal content is impacted by motion to enhance depth effects to provide, for example, parallax depth cues. For example, "motion parallax" is a depth cue that is due to relative velocities of objects moving in a scene. Closer moving objects appear will traverse a viewer's visual field faster than distant moving objects, even of the closer and farther objects are traveling at the same speed. Therefore, in some embodiments, an object detection function identifies objects and calculates their velocities based on, e.g., a frame-to-frame difference or change in their position. Those objects will be placed for viewing at a closer focal plane. In some embodiments, they are also scaled or enlarged. In this example, motion parallax is a property of an extended object.

FIGS. 7D through 7J illustrate various mechanics of blending, splitting, or spreading content between multiple layers of display content. Generically, these may be considered as multifocal versions of computer graphics shaders. As such, these embodiments are examples of what are called "multifocal shaders."

FIG. 7D shows a feathering blender. Display content 7A, 7B correspond to focal planes at d1 and d2 as extracted from a depth map 12. In a feathering blender, the edges of an object shown on one focal plane a smoothed. For example, the edges may be convolved with a Gaussian blur kernel. In some embodiments, an edge detection function (as a type of object detection) is used to determine the orientation and scale (size) of the edges, these parameters adjusting the parameters of the blur kernel. In some embodiments, the edges are detected by a computer vision function or a gradient operation.

In a feathering shader, a goal is to smooth the edges to minimize or obfuscate the discrete nature of the different focal planes. In some embodiments, the feathering is executed by detecting edges and adding some of the pixel value of one focal plane onto another focal plane and vice versa. (Edge detection methods include Sobel operator, Prewitt operator, Scharr operator, Roberts cross operator, Laplacian operator, Laplacian of Gaussian (LoG), canny edge detector, zero crossing detection, Marr-Hildreth Edge Detector, edge linking and boundary detection, histogram-based methods, and the like). In some embodiments, an intensity constraint at each point of featuring is imposed to maintain appropriate brightness levels. In some embodiments, the constraint is simply that the sum of corresponding pixels (pixels at the same lateral position in multiple focal planes) adds to a fixed value.

FIG. 7E shows a geometric scaling shader. A first content 7A is the same size as shown in the input content or the depth map 12, but a second content 7B is adjusted in size. This is a more specific case of a geometric warping function. The goal is to adjust the size of the image based on the focal plane's depth. This serves one of at least two purposes. First, in some embodiments, the adjusted size mimics or enhances contextual depth cues such as relative perspective or size. In some embodiments, the adjusted size assists in changing the visibility of the display content in the focal plane immediately behind the adjusted object, i.e., approximately where those pixel values are "missing" from a rear focal plane. In some embodiments, the scaling is not uniform. In some embodiments the scaling is linear. In some embodiments, the scaling in a first (e.g., horizontal) direction differs from that in a second (e.g., vertical) direction.

FIG. 7F shows an in-painting shader. In this embodiment, the content in a far layer 7A immediately behind a first content 7B, both extracted from a depth map may be dark because all the pixel values are assigned to the first content 7B. As such, an in-painting function is used to generate content behind the front layer.

The complexity of in-painting ranges. In some embodiments, the dark regions can be filled with a uniform color that matches a value or average value of the surrounding non-dark region. In some embodiments, the in-painting may copy and paste regions surrounding the non-dark region. In some embodiments, a generative AI module detects the context of the image and generates new content in the dark region. In some embodiments, the object that is being shown in the first content 7B is also shown on the second content but in a modified fashion, such as being blurred or dimmed. In these embodiments, the nature of the in-painting function is influenced by the desired quality of the multifocal image perception, including contrast, brightness, and shadow features. In-painting algorithms include: exemplar-based inpainting, texture synthesis, partial differential equations (PDE) based inpainting, deep learning based inpainting, edge-aware inpainting, sparse representation inpainting FIG. 7G shows a dithering shader, which adds noise artifacts to the first layer and second layer 7A and 7B. In some embodiments, the noise is added around the edges of the objects. In some embodiments the noise is added to the edges of the "shadow region" in front of or behind the object. Dithering creates the appearance of subtle changes in image quality, such as color or depth.

FIG. 7H shows a traditional blending shader. In this embodiment, for example a depth map 12 is used to generate a first display content 7A and a second display content 7B. In some embodiments, an object's true depth may lie in between the two physical focal planes. In this case, a nonzero pixel value corresponding to this object shows up on both focal planes. The intensity or RGB value that is presented on each focal plane is arbitrary. In some embodiments, it is determined by a linear weighting function, such that the weights correspond precisely to the desired depth of the object. In some embodiments, it is determined by a nonlinear function.

In some embodiments, all the pixel values are determined by an optimization algorithm. For example, a rendering software that uses a model of the human and the scene geometry/lighting properties may be used to calculate the expected perceived image $I_{exp}$. A second rendering software may be used to calculate the perceived image that is produced by the display system $I_{disp}$. And an optimization my be used to assign pixel values $C_i$ (where i corresponds to the $i^{th}$ pixel and takes on values 1 to N for a display system with a total of N pixels; here, N may be the total number of pixels of all display panels in a multi-display-panel system) to each display layer to minimize the difference:

choose$\{C_i\}$ such that $\|I_{exp}-I_{disp}\|$ is minimized.

The notation $\|\ldots\|$ represents a cost function calculated with a suitable norm, including, for example, L2-norm, L1-norm, L0-norm, Ln-norm, and the like. In this case, the multilayer content is modified by the optimization algorithm. In some embodiments, the optimization uses gradient decent, genetic algorithms, simulated annealing, particles swarm optimization, and the like. In some embodiments, the optimization is a convex optimization algorithm.

FIG. 7I shows a haze shader, suitable in particular for environmental/outdoor scenes. In outdoor environments, the atmosphere produces a hazy effect on increasingly distant objects. Although haze is different than blur, both lend themselves to creating depth effects. The haze in some embodiments is a haze kernel that operates on an extended object to produce a hazy version of the extended object via a superposition integral.

FIG. 7J shows a texture shader to add a texture or pattern to match natural image statistics. An AI module may be used to add objects based on the desired depth. The first depth content 7A is farther than the second depth content 7B, both extracted from a depth map. Natural image statistics are the statistical properties that correspond to naturally occurring scenes. In some cases the statistics may be for specific category of scenes, such as outdoor scenes, images of trees or forest environments, images of cities or manmade landscapes, naturally occurring landscapes, scenes with or without people, and the like. In some embodiments, the added texture may not be directly perceptible. In some embodiments, the statistics of the added texture depends on natural image statistics that have a power spectrum S that depends on the spatial scale k (measured in inverse length) following a power law, such as $S(k) \sim k^{\epsilon-2}$, where $\epsilon$ is a small quantity. Or the power spectrum may be $S(k) \sim \exp(-kx_0)$, where $x_0$ is a typical length scale. In some embodiments, the natural image statistics depends on the type of scene, for example, an outdoor scene, an indoor scene, a scene with people, and the like.

In some embodiments, in particular in those whose multifocal images are not necessarily real-world or scientifically precise scenes, an AI module may generate content that is visible to assist in depth perception effects. For example, in some embodiments, an AI module generates in one display depth a small image of a tree, car, house, building, or other large object to mimic an increased depth based on the perceived contextual information.

There are several visual effects that can be used to modify the multifocal content. In some embodiments, there is a scaling based on distance between the display layers. This may include scaling down the Foreground to match Background. (Foreground objects should ideally completely overlap and match the corresponding dark blank regions in the background. The farther the second display, more scaling down of foreground is needed. In some embodiments, there is scaling/rotation of the scene based on viewer's head movement.

In some embodiments, there is feathering or blending. Blending the layers at the edges for smooth transition may be produced. In some embodiments, there is feathering by blurring regions close to edges, or gradually decreasing the intensity close to edges. In some embodiments, there is inpainting to fill in blank regions. In these embodiments, the conversion system fills 1 the blank spaces in the background layers using in-painting techniques and utilizing neighboring color/texture, after extracting foreground objects.

In some embodiments a visual metric is used as part of the optimization. Such metrics include, for example, peak signal-to-noise ratio, structural similarity index, mean opinion score, HDR-VDP-2 (high dynamic range-visual difference predictor), video quality metric, feature similarity index, and color difference metrics.

In some embodiments, the features of an object may be placed on different layers. For example, edges may be shown on one plane and areas on another (with feathering). In this case, a segmentation function is used.

Figure 7K:
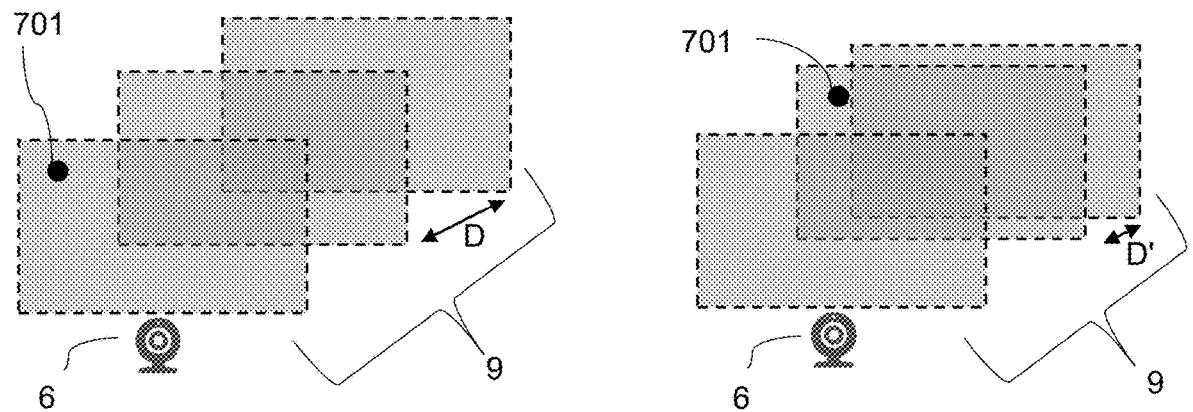

FIG. 7K shows an example of a dynamic-depth multifocal display. A camera 6 captures the eye gaze 701 of a viewer 1 and a computational module to calculate the content that is currently being observed as a multifocal virtual image 9. The display content is adjusted such that the distance D between two focal planes is changed to D'. This better uses the depth bandwidth of the system for optimal allocation of focal planes. It is the analog of foveated displays, wherein the resolution is high around the fixation point of the eye and lower elsewhere.

Figure 7L:
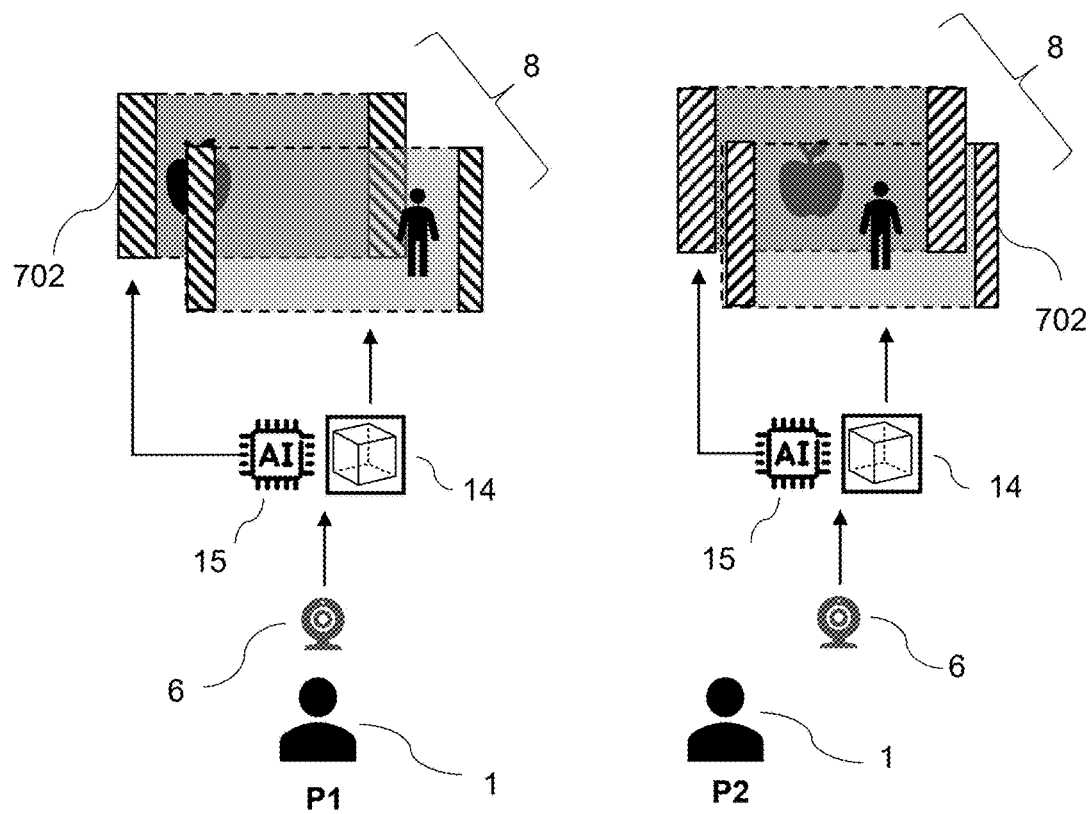

FIG. 7L shows an embodiment in which a viewer 1 is observed by a camera 6. The camera 6 detects the viewer's position and that information is part of a geometric warping function 14 input and an AI module 15 input, both of which dynamically change the display content and the subsequent virtual images 8 seen by the viewer 1. In some embodiments, the virtual images collectively form a multifocal virtual image. If the head tracking observes that the viewer 1 is in position P1, then the extended objects in the display content appear at a certain lateral position. If the viewer 1 is at position P2, then the lateral positions are shifted to enhance or reduce parallax effects. The geometric warping function 14 is used to calculate the properties of parallax effects, such as the baseline between the objects in different depth layers. The AI module 15 may be used to generate content on the edges. In some embodiments a computer vision function producing in-painting effects instead. In some embodiments, gestures are captured the camera for more active effects.

Figure 7M:
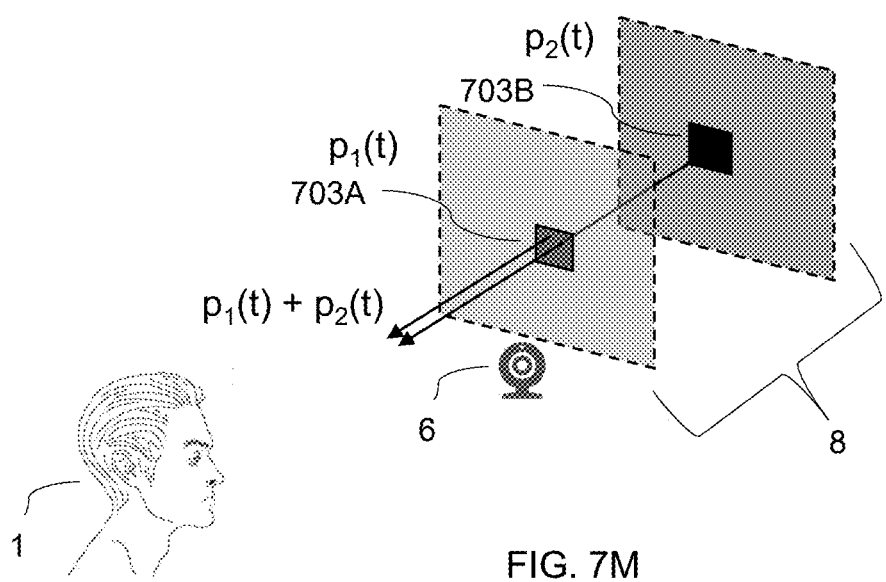

FIG. 7M shows an embodiment in which the multilayer display content produces virtual image 8 that are modulated in time. Such time modulation can be used in conjunction with refresh rate of underlying display panels or light sources that generate the content. A virtual image 8 may be a multifocal virtual image with have two focal planes, such that a pixel 703A in the first plane and a pixel 703B in the second plane direct rays along the same direction to a viewer 1 who sees a linear combination of the two pixels. By modulating in time, the optical properties of the perceived image in that direction can be adjusted. In some embodiments, a camera 6 detects a user position or eye gaze. In some embodiments, the flicker or refresh rate of the pixels is used to drive accommodation. In some embodiments, the temporal various is used as a mechanism for temporal blending. In some embodiments, the content is a video, and the temporal profile is used for anti-aliasing methods.

Figure 8A:
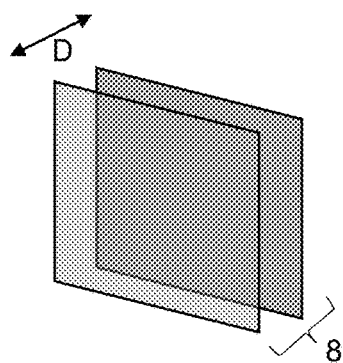
FIGS. 8A through 8C depict further embodiments of multifocal display content.
Figure 8B:
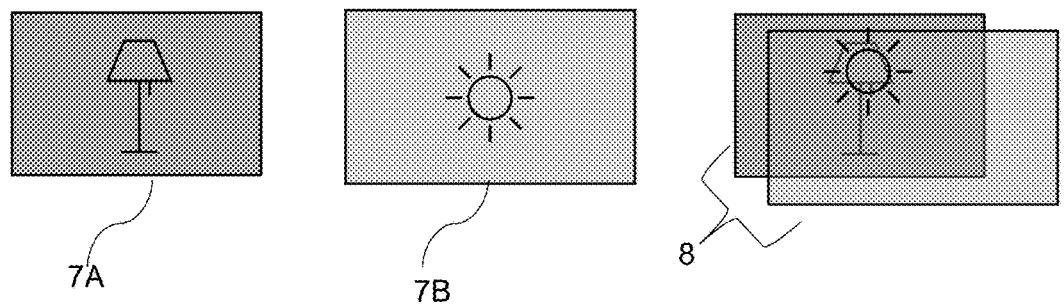
Figure 8C:
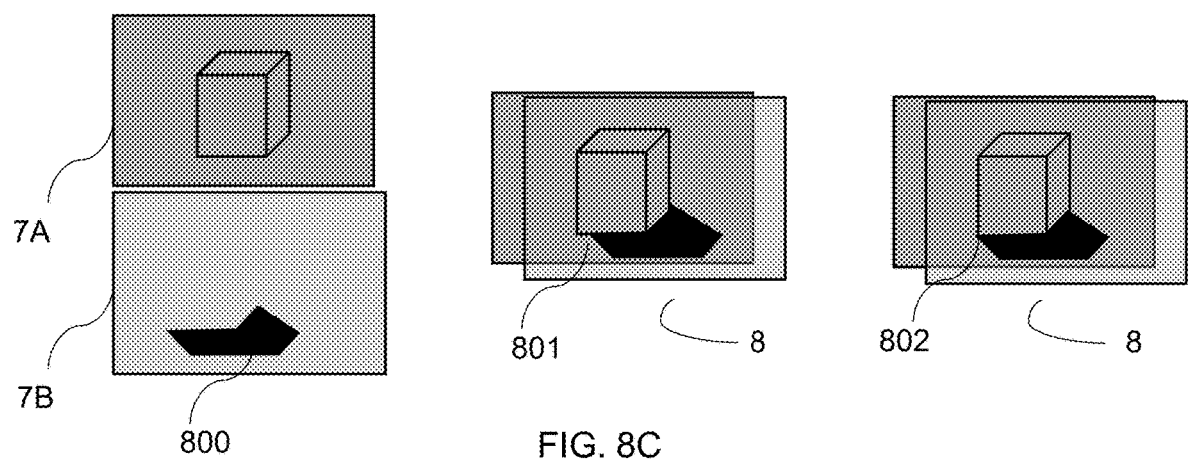

FIGS. 8A through 8C show further embodiments of multilayer display content is used for various applications. In such embodiments, the two focal planes are a distance D apart, as shown in FIG. 8A.

In FIG. 8B, a first content layer 7A may show an object. In some embodiments, the content is input into an AI module. In some embodiments, the content is input into a computer vision function, such as an object recognition function. In some embodiments, the content is preprogrammed as metadata, which is fed into a virtual display system simultaneously with the content itself. In any of these embodiments, a second layer content 7B is produced. The second layer adds a highlight effect related to the first layer. For example, if the first layer is a light source, the second layer may show an enhanced brightness or a reflection by changing the values of the pixels in that area. The multilayer content 7 together comprise an enhanced image of the underlying content.

Similarly, in FIG. 8C, multiple layers may be used to provide enhancements that mimic shadows. For example, a first content layer 7A may show an object that is intended to look three dimensional. In some embodiments, a second layer content 7B produces shadow-like effects 800. These effects may be different colors, or deeper/darker colors than the original object, based on a color theory. In some embodiments, the placement of the shadow-like effect is important. In the combined multilayer content 7, the shadow-like effect may mimic a T-junction 802 at a boundary of the original object, or it may form an X-junction 803. In some embodiments the different layers of the multifocal display or of the virtual displays are transparent or semi-transparent. In some embodiments, other junctions can be mimicked, such as omega-junctions, Y-junctions, arrowhead junctions, and the like. The junctions can be non-reversing, single-reversing, or double reversing. In some embodiments, the junction or reversing properties are only approximated based on color effects of the different layers.

Figure 9A:
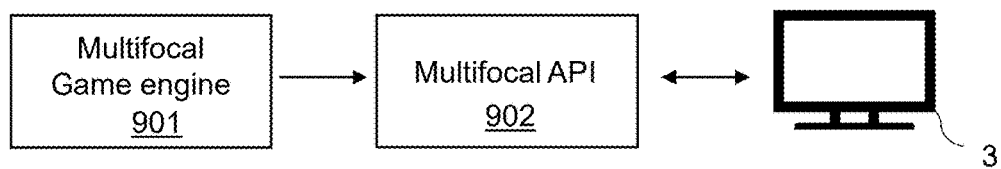
FIGS. 9A through 9C depict applications of multifocal display content and conversion systems for gaming applications.
Figure 9B:
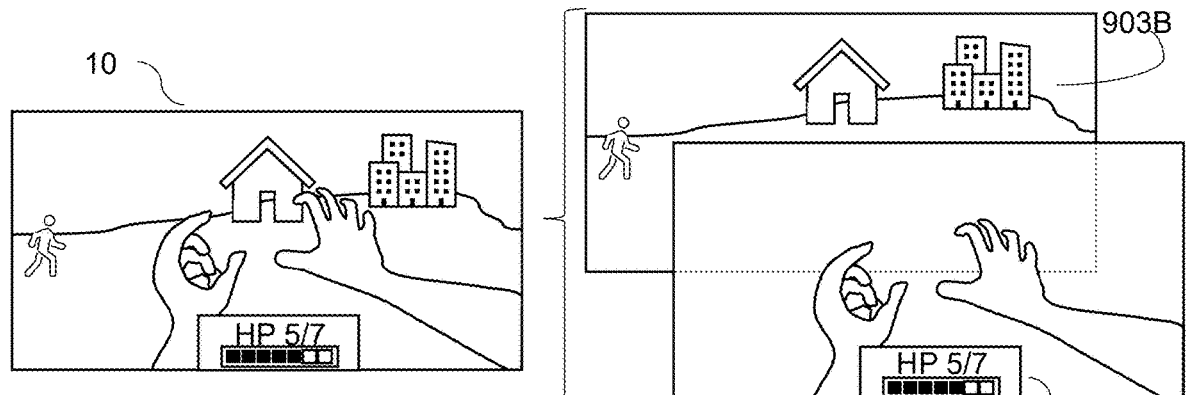
Figure 9C:
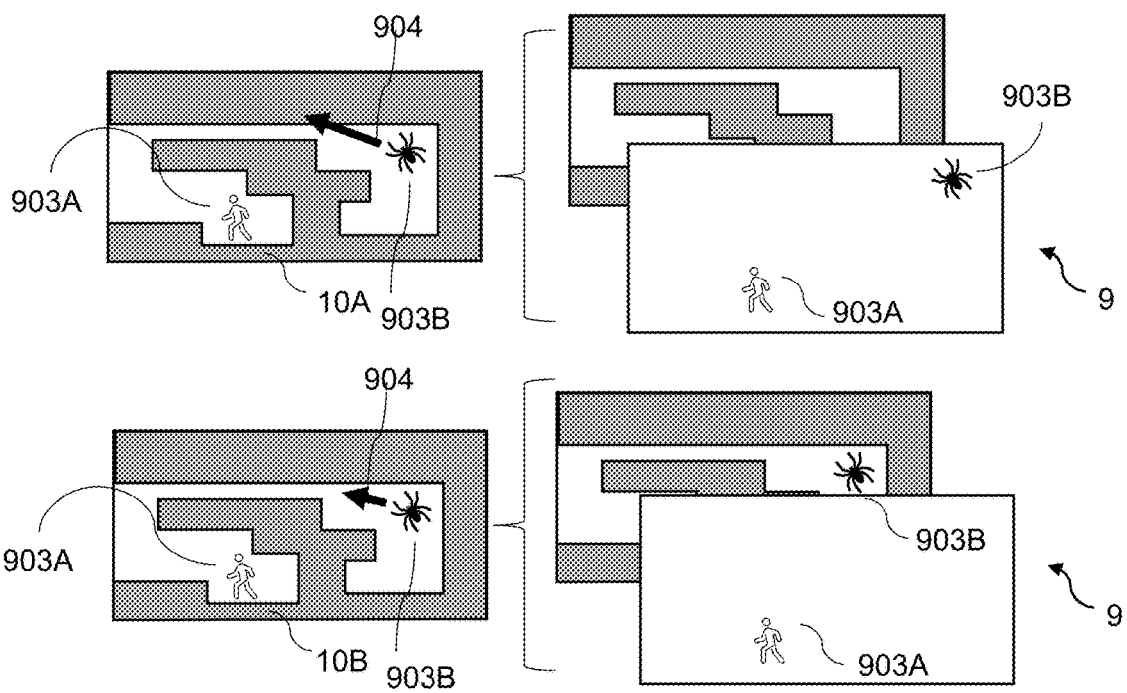

FIGS. 9A through 9C show examples of using a multifocal display or a virtual display for gaming applications. In some embodiments, the application is a simulation training application or simulation training environment. FIG. 9A is a block diagram of programming or creating a video game for virtual displays. The environment in which the game is created is a multifocal game engine 901, which includes the ability to program content on multiple focal planes. In some embodiments, a multifocal API 902 is used to interface the game engine content with a display system 3, which may be a virtual display system.

In FIG. 9B, a first-person-shooter style game is produced. The original input content 10 may be meant for a standard display system, i.e., meant for display on a single monitor, LCD panel, OLED, and the like. The output content is a multifocal virtual image 9 that includes an environmental layer 903B and a user layer 903A. In some embodiments, e.g., for simulation training environments, the near layer is a cockpit with instrumentation cluster; and the far layer is the environment as would be seen by a flight deck.

FIG. 9C shows an embodiment of a side-scrolling style game. In some embodiments, segmentation for multifocal display systems is motion-based. In some embodiments, the original content 10A includes a first character 903A and a second character 903B. The second character may be moving with a velocity vector 904. The conversion system in some embodiments produces multifocal virtual image 9 that depends on the velocity vector. For example, if the velocity vector is large, the second character 903B is shown in a near focal plane along with the first character 903B.

In some embodiments with input content 10B, the first character 903A is shown and the second character 903B is shown with a velocity vector 904 that is different, e.g., smaller, than in the first case. In this example, the second character 903B is shown on a farther focal plane of the multifocal virtual image 9. In this way, the content is more prominent for the viewer depending on characteristics of the scene. In this example, the velocity may be determined by programmed data associated with the second character 903B or the input content 10A generally. In some embodiments, several frames of input content are input into the conversion system, and the velocity is determined by calculating the change in the position of the second character 903B or by an optical flow algorithm. In the examples of FIGS. 9B and 9C, the multifocal rendering may be completed in real time.

In some embodiments, the motion of the object or character is determined by motion parallax, such that faster moving objects are placed within the multifocal display content to be viewed at a closer focal plane.

Figure 10A:
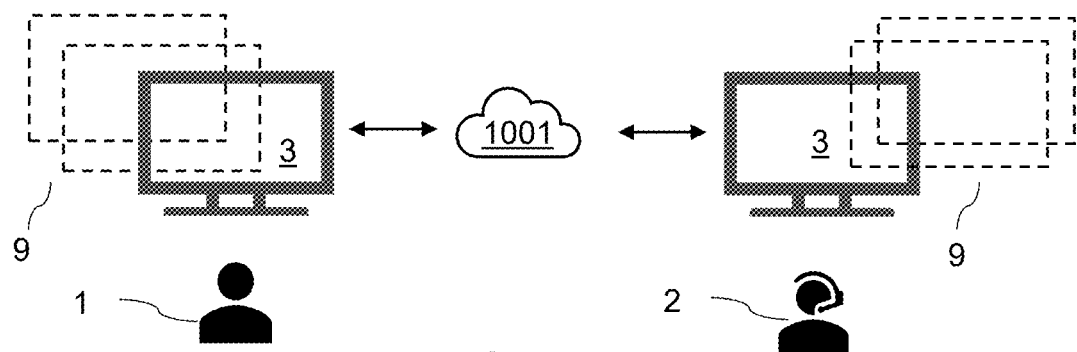
FIGS. 10A and 10B depict applications of multifocal display content and conversion systems for teleconferencing applications.
Figure 10B:
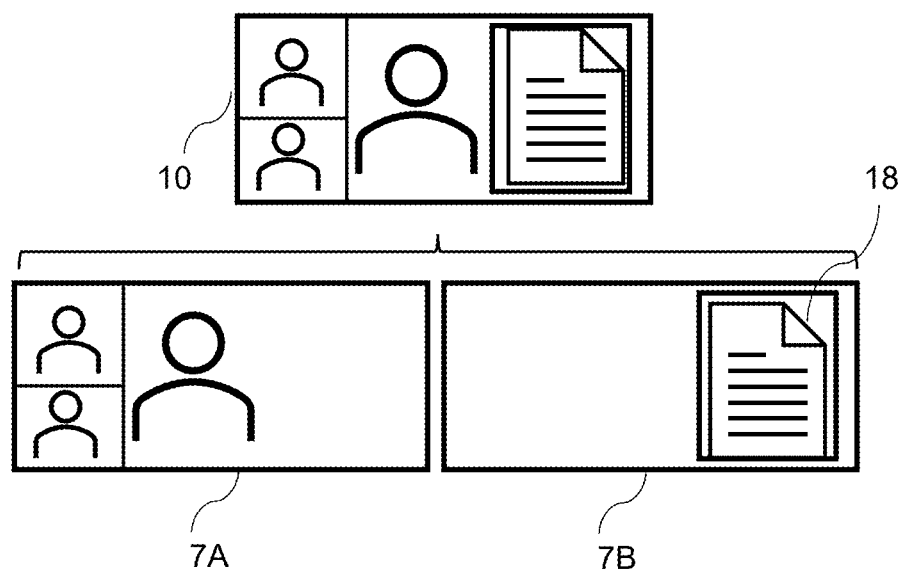

FIGS. 10A and 10B show example embodiments of the conversion system for use in teleconferencing applications. A network connection 1001 connects a user 1 to a collaborative user 2, each using his own display system. In some embodiments, either or both of the display systems is a virtual display system. In some embodiments, either virtual display system is a multifocal display system that shows multifocal virtual image 9. FIG. 10B shows an example of input content 10 that may be converted into a first multifocal display content 7A and a second multifocal display content 7B, which may include an annotation 19. In some embodiments, the multifocal conversation is completed in real time.

Figure 11A:
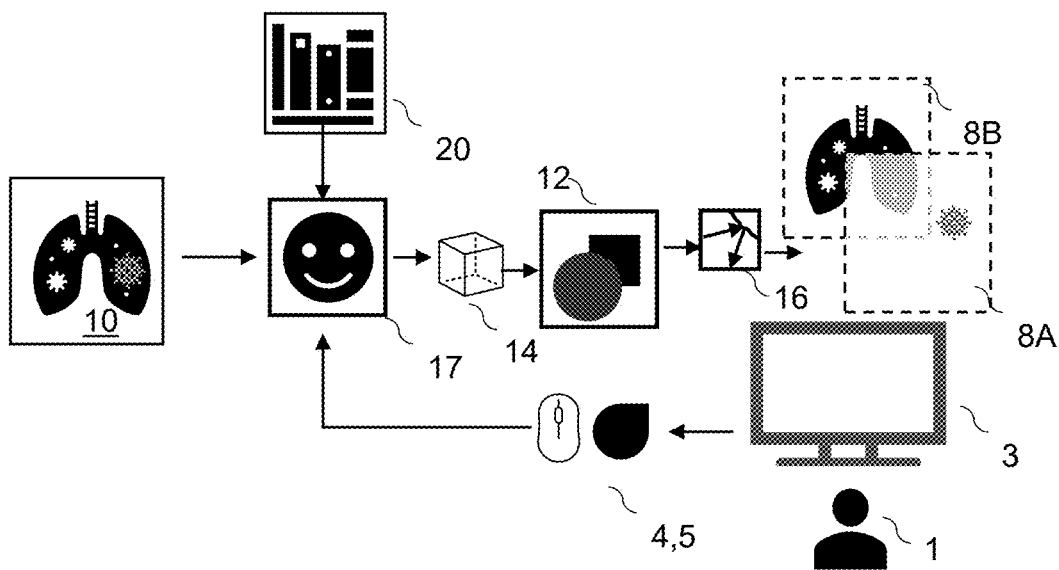
FIGS. 11A through 11C depict user-determined applications of multifocal content conversion.
Figure 11B:
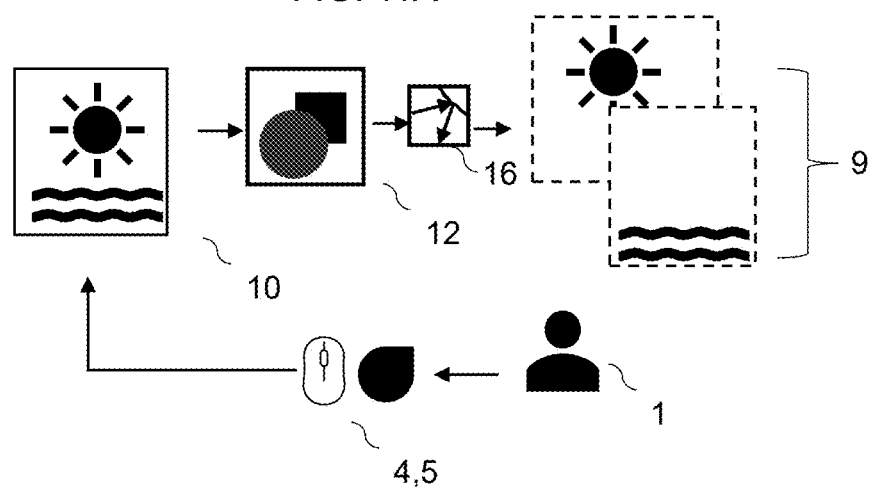
Figure 11C:
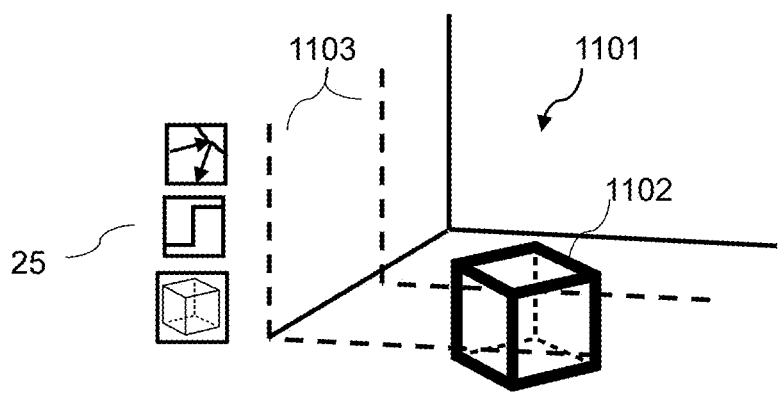

FIGS. 11A through 11C show examples in which the multifocal conversion is completed for a user-defined application. In these embodiments, the multifocal display is used to exaggerate or enhance a feature of the scene, i.e., to extract information about an extended object of the input visual content and use that information to impact a multifocal display content. Such features include color, contrast, spatial frequency, edges, and certain morphological structures. In some embodiments, a computer vision function or object detection function is used to identify the information. In some embodiments, a function evaluates pixel values and operates on those pixels that satisfy a certain threshold property, such as being brighter than a certain value, or dimmer than a certain value. In some embodiments, the conversion system uses a function that performs a Fourier transform to operate in the spatial frequency domain.

For example, a conversion system may implement a partial Fourier transform to identify feature sizes within subregions of the input visual content, threshold those feature sizes, and show feature sizes above the threshold at one focal plane, and feature sizes above the threshold at a second focal plane. In some embodiments, there is more than one threshold, corresponding to more than one focal plane, for example, three threshold levels corresponding to three focal planes.

For example, in some embodiments, a conversion system may use a function that takes in pixel intensities or individual R, G, B values and design whether those pixels are to be shown on a first focal plane (if above a threshold) or a second focal plane (if below a threshold). As an example, in a scene showing an environment with a light source such as a lamp, the extended object is the lamp, a threshold function measures that the pixels in the vicinity of the lamp are above a threshold, and so those pixels are shown on a closer focal plane than the rest of the environment, even though the entire environment, including the lamp, are all at approximately the same scene depth.

In some of these embodiments, the goal of converting to multifocal display content is to enhance certain effects or features of the underlying content, rather than producing realistic 3D perception effects. For example, FIG. 11A shows an embodiment for medical or scientific imaging/display. The input content 10 may be a medical image. For example, in some embodiments, it is an X-ray, or a slice of an MRI, PET scan, and the like. The input content 10 passes through an object detection function 17 which then sends the content through a geometric transformation function 14 to produce a depth map. The depth map may be such that different content is shown at different depths regardless of the true depths embedded in the original content.

In some embodiments, a library 20 is used for the object detection function. In some embodiments, the library is a user defined library, such that a viewer viewing a first virtual image 8A and a second virtual image 8B (together, in some embodiments, the virtual images collectively form a multifocal virtual image) on a display system sees different content on different layers depending on his own preferences or goals. In some embodiments, the user 1 may input information through a user input 4 or sensor 5 into the object detection function 17 to impact or change the consequent depth map 14. In some embodiments, this feedback and rendering are completed in real time. The (user-defined) library contains a specialized set of functions that may be used for a specific application. For example, the library may include an object detection function that specifically detects certain morphological features of an extended object of a medical image, separates those features and extended object, and shows them on a different focal plane than the rest of the image. In general, the library may contain any of the functions described herein, and those contained functions can be arbitrarily engineered with pre-selected or user-defined parameters.

FIG. 11B shows an example in which an input content 10 may not have depth information, and the created depth map 12 is determined by a user input 4 or a user sensor 5. The multifocal virtual image 9 may include two focal planes including a foreground focal plane and a background focal plane. In some embodiments, the input content 10 may be a cartoon, animation, or the like. In some embodiments, the feedback and conversion may be done in real time.

In some embodiments like FIGS. 11A and 11B, a ray-tracing module 16 is used to render the images. In some embodiments, the ray-tracing module is carried out on a GPU and is a real-time ray-tracing module.

FIG. 11C shows an interface for a multifocal gaming engine environment 1101. In some embodiments a game object 1102 is positioned along a variety of user-chosen focal planes 1103. A function block 24 can be used to select different multifocal-centric functions.

Figure 12A:
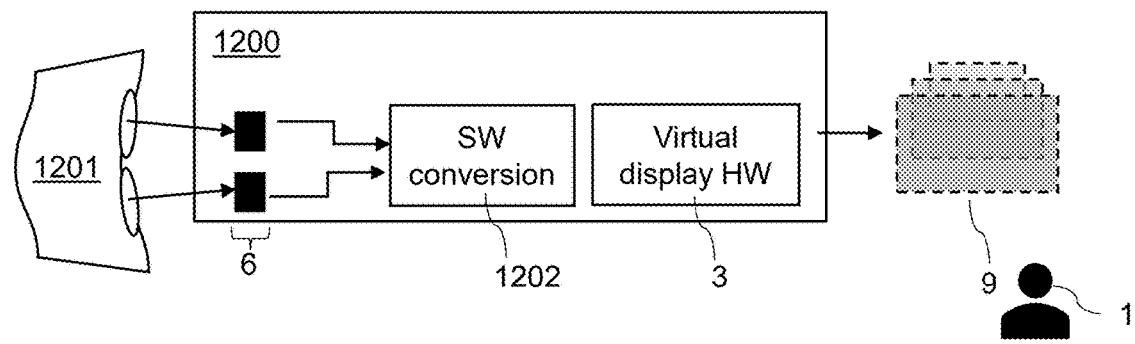
FIGS. 12A and 12B depict auxiliary hardware embodiments for optimizing or converting one visual content onto another using additional hardware tools.
Figure 12B:
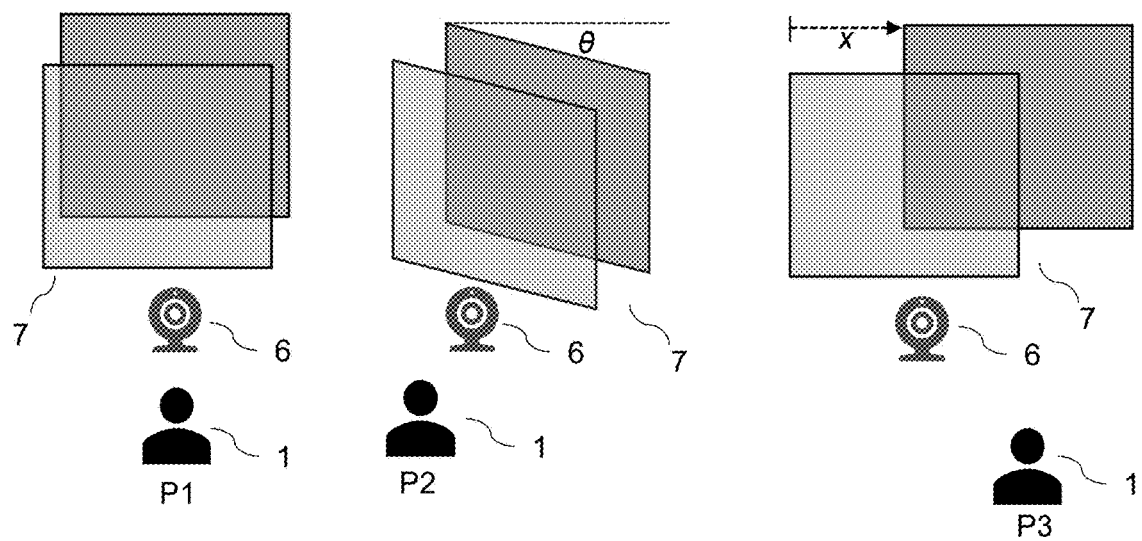

FIGS. 12A and 12B show auxiliary embodiments for implementing multifocal displays. In FIG. 12A a stereoscopic-based virtual display system 1201 produces two images. This may be a VR headset, for example. The images are fed into respective cameras 6 as a first step in a hardware-based conversion system 1200. The images are fed as input content into a software conversion block 1202, which may convert the images into a depth map for multifocal display system. The content is then fed into a virtual display hardware block, which may be a virtual display system 3. The result is a multifocal virtual image 9 for a viewer 1 to see. This conversion may be done in real-time as an adaptor between the headset and the virtual display system.

FIG. 12B shows an example in which the display layers 7 are adjusted mechanically. In some embodiments, one or more optical components, including, e.g., a display panel, is moved. A camera 6 senses a position of a user 1 when the user 1 is position P1 the layers are in one orientation, When the user is in position P2, the angle of the display content is changed to an angle θ. When the user 1 is in position P3, the display layers may shift laterally a distance x relative to each other.

In any of the embodiments above, the conversion from an input content to a multifocal content can depend on the type of input content, as well as on parameter chosen by a user of the conversion system or a viewer of the resulting multifocal content. For example, if the input content is a 2D image, the user must locate the video or image file and choose the location of the output file. The user may choose how many layers the resulting multifocal content should be. The user may choose whether the conversion is fully automatic or semi-automatic, i.e., whether or not the user may directly assist in assigning depth content to the starting input. For a semi-automatic method, the user may input, for example, keywords or phrase ("person", "car," "circle," and the like) in order to assist with a segmentation function. The user may point and click on certain regions of the input content to initiate a depth map production or produce a course depth map. For a fully automatic method, the user may simple choose a pre-trained model and allow it to extract depths with or without unsupervised segmentation.

For input content corresponding to a 3D point cloud or for a stereoscopic input content, the user may input into the conversion software information about the recording camera or prior information to be used or assumed. This includes baseline geometric values, intrinsic and extrinsic camera parameter, field-of-view or depth-of-field information of the camera, and the like.

What is claimed:

1. A conversion system comprising:
   a first computational module to receive an input two-dimensional (2D) visual content lacking depth information about the 2D visual content;
   a second computational module having a first function to estimate a depth map from the input 2D visual content without reference to independent data about the depth information, the depth map corresponding to the input 2D visual content; and
   a third computational module to use a color calibration to format the depth map and the input 2D visual content as content for display as a multifocal virtual image on a virtual display system, wherein the color calibration corrects a chromatic variation of a human vision system.

2. The conversion system of claim 1, further comprising the virtual display system to display the multifocal virtual image.

3. The conversion system of claim 1, wherein the first computational module takes as input at least one parameter of a multifocal output template.

4. The conversion system of claim 1, further comprising a sensor to capture information about a viewer of the virtual display system, wherein the function of the second computational module uses the information to modify the content of the multifocal virtual image.

5. The conversion system of claim 1, wherein the first function of the second computational module modifies the content of multifocal virtual image based on a property of a human vision system.

6. The conversion system of claim 1, wherein the first function of the second computational module modifies the content of the multifocal virtual image based on a physics model of the input 2D visual content.

7. The conversion system of claim 1, wherein the first function of the second computational module modifies the content of the multifocal virtual image using an in-painting subfunction or an artificial intelligence (AI)-generative subfunction.

8. The conversion system of claim 1, wherein the input 2D visual content is selected from a group consisting of a 2D color image, a 2D monochrome image, a 2D video, a 2D movie, a 2D animation, and combinations thereof.

9. The conversion system of claim 1, further comprising a graphical user interface to show a list of choices of input 2D visual content, a list of parameters to impact the function, and a locator to determine where to save the content.

10. The conversion system of claim 1, wherein the second computational module further includes an optimization function to operate on the input 2D visual content to impact the multifocal virtual image.

11. The conversion system of claim 1, wherein the first function of the second computational module impacts an optical property of the multifocal virtual image, the optical property being selected from a group consisting of color, intensity, polarization, directionality, and combinations thereof.

12. The conversion system of claim 1, wherein the second computational module operates in real time, and the input 2D visual content is selected from a group consisting of a video game environment, simulation training environment, and a teleconferencing environment.

13. The conversion system of claim 1, wherein the second computational module includes a neural network to operate on the input 2D visual content.

14. The conversion system of claim 1, wherein one of the first computational module, the second computation module, or the third computational module (i) creates a parameterization of the depth map using a thresholding function, and (ii) assigns pixel values to every focal plane in the multifocal virtual image based on the depth map, the input visual content, and the parameterization.

15. The conversion system of claim 1, wherein the multifocal virtual image is impacted by a multifocal shader, the multifocal shader selected from a group consisting of a feathering shader, a geometric scaling shader, an in-painting shader, a dithering shader, a blending shader, haze shader, and a texture shader.

16. The conversion system of claim 1, wherein the multifocal virtual image is modified by a property of an extended object in the input visual content.

17. The conversion system of claim 1, wherein the multifocal virtual image is visible in a continuous headbox spanning at least 30 cm, wherein the headbox is a continuous volume in which the multifocal virtual image able to be viewed by both eyes of an observer.

18. The conversion system of claim 1, wherein the multifocal virtual image is impacted by a feathering shader.

19. The conversion system of claim 1, wherein the second computational module further comprises a semantic segmentation function to operate on the input 2D visual content and the depth map to produce a segmentation of the depth map, wherein the semantic segmentation is a neural-network based operation.

20. The conversion system of claim 1, wherein the first function is implemented at least in part by at least one of the group consisting of a feedforward neural network, a recurrent neural networks (RNN), a residual neural network, a generative adversarial networks (GANs), a modular neural networks, a transformer-based network, a semantic segmentation neural-network based operation, a feedforward network, a multi-layer perceptron network, and a convolutional neural networks (CNN).

21. A conversion system comprising:
a first computational module to receive an input two-dimensional (2D) visual content lacking depth information about the 2D visual content;
a second computational module having a function to estimate a depth map from the input 2D visual content without reference to independent data about the depth information, the depth map corresponding to the input 2D visual content; and
a third computational module (i) to use the depth map to assign each of a plurality of pixels of the input 2D visual content to a focal plane among a plurality of focal planes of and (ii) to use a color calibration function to correct a chromatic variation of a human vision system.

22. The conversion system of claim 21, further comprising a virtual display system to display the multifocal virtual image.

23. The conversion system of claim 21, wherein the virtual display system comprises a first light source that produces a first display content for the first focal plane, and a second light source that produces a second display content for the second focal plane.

24. The conversion system of claim 21, wherein the information is a property selected from a group consisting of color, spatial frequency, brightness, size, shape, morphology, and combinations thereof.

25. The conversion system of claim 21, wherein the second computational module uses an object detection function to identify the information.

26. The conversion system of claim 21, wherein the second computational module uses a threshold function to format the information.

27. The conversion system of claim 21, wherein the first focal plane and the second focal plane correspond respectively to a foreground and a background of the 2D visual content.

28. A conversion method comprising:
receiving an input two-dimensional (2D) visual content lacking depth information about the 2D visual content;
operating on the input visual content with a function to estimate a depth map from the input 2D visual content without reference to independent data about the depth information, the depth map corresponding to the input 2D visual content; and
formatting the input 2D visual content using the depth map and a color correction for display as a multifocal virtual image, wherein the color calibration corrects a chromatic variation of a human vision system.

29. The conversion method of claim 28, wherein the input 2D visual content is selected from a group consisting of a color image, a monochrome image, a video, a movie, an animation, a stereoscopic pair, a three-dimensional point cloud, an anaglyph, an autostereoscopic content, and combinations thereof.

30. The conversion method of claim 28, further comprising displaying the multifocal virtual image on a virtual display system.

\* \* \* \* \*